(12) United States Patent
Mori

(10) Patent No.: US 8,488,194 B2
(45) Date of Patent: Jul. 16, 2013

(54) IMAGE PROCESSING CONTROLLER AND PRINTING APPARATUS

(75) Inventor: Shunichiro Mori, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 436 days.

(21) Appl. No.: 12/942,944

(22) Filed: Nov. 9, 2010

(65) Prior Publication Data

US 2011/0109927 A1    May 12, 2011

(30) Foreign Application Priority Data

Nov. 10, 2009 (JP) ................................. 2009-256866
May 6, 2010 (JP) ................................. 2010-106430

(51) Int. Cl.
*H04N 1/60* (2006.01)

(52) U.S. Cl.
USPC ............................ 358/1.9; 358/3.01; 358/3.21

(58) Field of Classification Search
USPC ............... 358/1.1, 1.9, 3.01, 3.06, 3.07, 3.21, 358/3.23, 1.13
See application file for complete search history.

(56) References Cited

U.S. PATENT DOCUMENTS

| 6,466,225 B1* | 10/2002 | Larkin et al. ................. 345/596 |
| 2006/0238812 A1* | 10/2006 | Kang ........................... 358/3.06 |
| 2008/0252914 A1 | 10/2008 | Mori |

FOREIGN PATENT DOCUMENTS

| JP | 2001-230930 A | 8/2001 |
| JP | 2003-295701 A | 10/2003 |
| JP | 2005-234253 A | 9/2005 |
| JP | 2008-078722 A | 4/2008 |

* cited by examiner

*Primary Examiner* — Thomas D Lee
(74) *Attorney, Agent, or Firm* — Kilpatrick Townsend & Stockton LLP

(57) ABSTRACT

An image processing controller for performing screen processing for tone reduction of input image data, which has a tone value in N1 tones (where N1 is an integer that is greater than or equal to four) for each pixel, from the N1 tones into N2 tones (where N2 is an integer that is greater than or equal to three but less than N1) and generating output image data that is to be supplied to a printing unit, the printing unit being configured to be able to form an output image with the use of a recording material in accordance with the output image data, the output image data having N3 tones greater than the N2 tones of intermediate image data (N3 is an integer that is greater than N2), the intermediate image data being generated as a result of the screen processing performed on the input image data.

8 Claims, 14 Drawing Sheets

FIG. 4A

LUT1

| TONE VALUES OF INTERMEDIATE IMAGE DATA | TONE VALUES OF OUTPUT IMAGE DATA |
|---|---|
| 0 | 0 |
| 1 | 4 |
| 2 | 8 |
| 3 | 12 |
| 4 | 16 |
| 5 | 20 |
| 6 | 24 |
| 7 | 28 |
| 8 | 32 |
| 9 | 36 |
| 10 | 40 |
| 11 | 44 |
| 12 | 48 |
| 13 | 52 |
| 14 | 56 |
| 15 | 63 |

(NORMAL MODE)

FIG. 4B

LUT2

| TONE VALUES OF INTERMEDIATE IMAGE DATA | TONE VALUES OF OUTPUT IMAGE DATA |
|---|---|
| 0 | 0 |
| 1 | 2 |
| 2 | 4 |
| 3 | 6 |
| 4 | 8 |
| 5 | 10 |
| 6 | 12 |
| 7 | 14 |
| 8 | 16 |
| 9 | 18 |
| 10 | 20 |
| 11 | 22 |
| 12 | 24 |
| 13 | 26 |
| 14 | 28 |
| 15 | 30 |

N2 TONES / N2 LEVELS (TONER SAVE MODE 1)
(FOR GRAPHIC/PHOTOGRAPH)

FIG. 4C

LUT3

| TONE VALUES OF INTERMEDIATE IMAGE DATA | TONE VALUES OF OUTPUT IMAGE DATA |
|---|---|
| 0 | 0 |
| 1 | 4 |
| 2 | 8 |
| 3 | 12 |
| 4 | 15 |
| 5 | 18 |
| 6 | 21 |
| 7 | 24 |
| 8 | 27 |
| 9 | 30 |
| 10 | 32 |
| 11 | 34 |
| 12 | 36 |
| 13 | 37 |
| 14 | 38 |
| 15 | 39 |

(TONER SAVE MODE 2)
(FOR CHARACTERS)

FIG. 7A  SCREEN PROCESSING
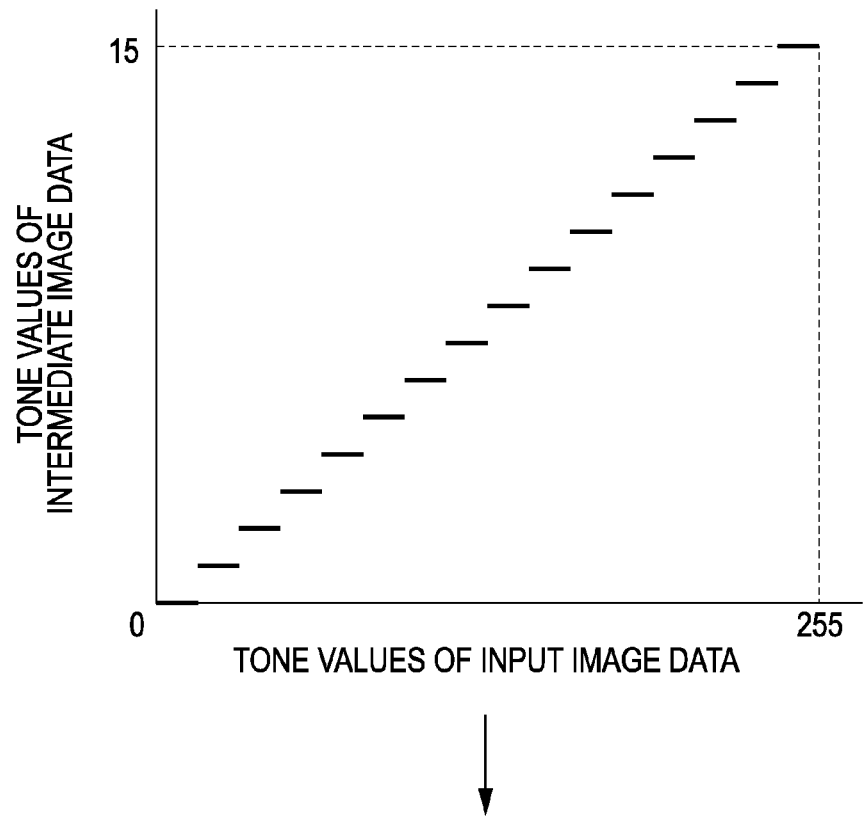
FIG. 7B  TONE CONVERSION PROCESSING
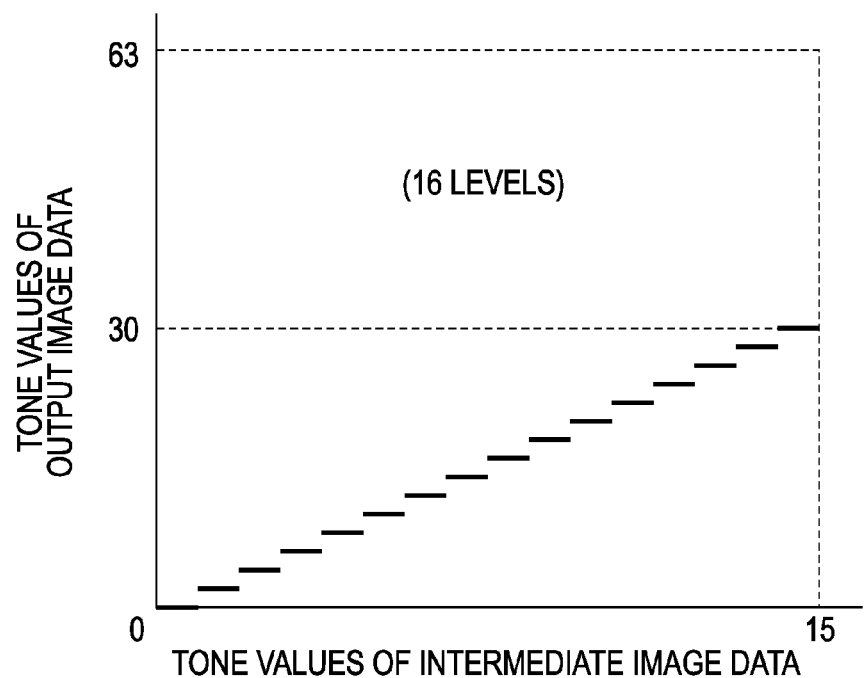

IMAGE PROCESSING CONTROLLER AND PRINTING APPARATUS

BACKGROUND

1. Technical Field

The present invention relates to an image processing controller that performs screen processing on input image data for reducing the number of tones thereof to three or more inclusive of halftone and generates output image data. The output image data is supplied to a printing unit. In addition, the invention relates to a printing apparatus that forms an output image.

2. Related Art

FIG. 13 is a block diagram that schematically illustrates an example of the configuration of a laser printer 910 according to related art. The laser printer 910 includes a screen processing unit 911, a PWM (Pulse Width Modulation) unit 912, and a print engine 913. The laser printer 910 outputs a print image 931 corresponding to input image data 920. The input image data 920 contains a bitmap image expressed in 256 grayscale levels. The input image data 920 has an 8-bit tone value (i.e., an integer ranging from 0 inclusive to 255 inclusive) in each of a plurality of pixels 921. The screen processing unit 911 performs screen processing, which is tone-reduction processing performed for each of the pixels 921 of the input image data 920 for reducing the 8-bit tone value in 256 grayscale levels into a 4-bit tone value in 16 grayscale levels. The Image data in 16 grayscale levels is outputted to the PWM unit 912. The PWM unit 912 converts the image data outputted from the screen processing unit 911, which has the 4-bit tone value (i.e., an integer ranging from 0 inclusive to 15 inclusive) in each of the pixels 921, into a pulse signal that is suited for laser-beam dot formation. The PWM unit 912 outputs the pulse signal to the print engine 913. In accordance with the pulse signal, the print engine 913 forms toner dots on a print target medium 930 to output the print image 931.

A printing apparatus that can perform printing in a "toner save" mode is known in the art. The toner save mode is an operation mode for reducing the consumption of toner, which is an example of a recording material. The following schemes are known as methods for offering such a toner save mode: (1) a method of reducing the power of laser beam emission of the print engine 913, (2) a method of decimating dots to form a specific pattern of dot arrangement at the screen processing unit 911 (refer to FIG. 1(b) in JP-A-2001-230930), and (3) a method of reducing the tone value of image data outputted from the screen processing unit 911.

FIG. 14A is a diagram that schematically illustrates an example of the above method (2) of decimating dots. For example, it is assumed that output image data 941 having a tone value of 15 (which is the maximum value in 16 grayscale levels) in each of a plurality of pixels is generated in a normal mode. The normal mode is a mode for forming the print image 931 by using the normal amount of toner. In a toner save mode, that is, a mode for forming the print image 931 while saving toner, output image data 942 having a predetermined pattern due to dot decimation at some pixels is generated.

FIG. 14B is a diagram that schematically illustrates an example of the above method (3) of reducing the tone value of image data outputted from the screen processing unit 911. For example, it is assumed that output image data 943 having a tone value of 15 (which is the maximum value in 16 grayscale levels) in each of a plurality of pixels is generated in the normal mode. In the toner save mode, output image data 944 having a reduced tone value of 7, which is a halftone value in 16 grayscale levels, in each of the plurality of pixels is generated.

An image processing method that can save toner without performing any additional processing that is unique to the saving of toner concurrently with color processing is disclosed in JP-A-2003-295701. In the image processing method disclosed therein, a toner saving rate has been pre-applied to a gamma table that is used during color conversion. That is, the tone value of image data before being inputted into a screen processing unit has been reduced in advance. By this means, the tone value of image data outputted from the screen processing unit is reduced.

The above method (1) of reducing the power of laser beam emission has a disadvantage in that it is necessary to provide some means for adjusting the power of laser beam emission. Therefore, a laser printer that is not provided with any means for adjusting the power of laser beam emission cannot offer the toner save mode. The above method (2) of decimating dots has a disadvantage in that an unintended pattern or jaggies may be generated depending on a dot decimation pattern. The above method (3) of reducing the tone value of output image data has a disadvantage in that, as illustrated in FIG. 14C, an output can be expressed in the toner save mode in eight grayscale levels only, which correspond to tone values ranging from 0 inclusive to 7 inclusive, although the output can be expressed in the normal mode in 16 grayscale levels, which correspond to all tone values ranging from 0 inclusive to 15 inclusive. In other words, the number of grayscale levels available for reproduction of the output image data in the toner save mode is eight only.

An image processing apparatus disclosed in JP-A-2001-230930 includes a TRC (Tone Reproduction Curve) correction unit. The image processing apparatus disclosed therein converts an 8-bit color component signal for each of cyan (C), magenta (M), yellow (Y), and black (K) into a 1-bit color component signal for each of C, M, Y, and K on a pixel-by-pixel basis at the TRC correction unit. That is, the image processing apparatus disclosed therein has a problem in that, since there are two tones only for a color-separated signal after the TRC correction processing, halftone information will be lost. For this reason, a print image can be expressed in two grayscale levels only.

SUMMARY

An advantage of some aspects of the invention is to provide a technique for maintaining picture quality as much as possible in a recording material saving mode, which is a mode for forming an output image while saving a recording material.

An image processing controller according to a first aspect of the invention is provided to offer the above advantage without any limitation thereto. The image processing controller performs screen processing for tone reduction of input image data, which has a tone value in N1 tones (where N1 is an integer that is greater than or equal to four) for each pixel, from the N1 tones into N2 tones (where N2 is an integer that is greater than or equal to three but less than N1) and generates output image data that is to be supplied to a printing unit. The printing unit is configured to be able to form an output image with the use of a recording material in accordance with the output image data. The output image data has N3 tones greater than the N2 tones of intermediate image data (N3 is an integer that is greater than N2). The intermediate image data is generated as a result of the screen processing performed on the input image data. The image processing controller includes: a correspondence prescribing section that has a recording-material-saving correspondence that is used in a recording material saving mode for forming the output image while saving the recording material, the recording-material-saving correspondence prescribing correspondence between tone values of the intermediate image data having the N2 tones and tone values of the output image data having the N3 tones; and a recording-material-saving image processing section that performs the screen processing on the input image data having the N1 tones to generate the intermediate image data having the N2 tones, converts the intermediate image data having the N2 tones into the output image data having the N3 tones according to the recording-material-saving correspondence, and then supplies the output image data to the printing unit.

A printing apparatus according to a second aspect of the invention performs screen processing for tone reduction of input image data, which has a tone value in N1 tones (where N1 is an integer that is greater than or equal to four) for each pixel, from the N1 tones into N2 tones (where N2 is an integer that is greater than or equal to three but less than N1) and performs printing. The printing apparatus includes: a printing section that forms an output image with the use of a recording material in accordance with output image data, the output image data having N3 tones greater than the N2 tones of intermediate image data (N3 is an integer that is greater than N2), the intermediate image data being generated as a result of the screen processing performed on the input image data; a correspondence prescribing section that has a recording-material-saving correspondence that is used in a recording material saving mode for forming the output image while saving the recording material, the recording-material-saving correspondence prescribing correspondence between tone values of the intermediate image data having the N2 tones and tone values of the output image data having the N3 tones; and a recording-material-saving image processing section that performs the screen processing on the input image data having the N1 tones to generate the intermediate image data having the N2 tones, converts the intermediate image data having the N2 tones into the output image data having the N3 tones according to the recording-material-saving correspondence, and then supplies the output image data to the printing section.

That is, in the recording material saving mode, the recording-material-saving image processing section performs screen processing on the input image data having the N1 tones to generate the intermediate image data having the N2 tones instead of directly converting the input image data into the output image data having the N3 tones ($3 \leq N2 < N3$). Then, the recording-material-saving image processing section converts the intermediate image data having the N2 tones into the output image data having the N3 tones (N3>N2) according to the recording-material-saving correspondence. The printing unit/section forms an output image in accordance with the output image data. Since the available levels of the tone values of the output image data supplied to the printing unit/section are made greater in the recording material saving mode, it is possible to maintain picture quality as much as possible.

Herein, the term "tones" means possible levels (i.e., available levels) for a value of each pixel. When there are N tones (where N is an integer that is greater than or equal to two), it means that there are N levels for a value of each pixel. The term "tone value" means a value having a certain tone. For example, if the tone value of a certain pixel is any one of 0, 1, . . . , N−1, there are possible N levels as its tones. The term "halftone" means tones (or a tone) expressed by tone values exclusive of the maximum tone value and the minimum tone value.

The recording material includes, for example, toner, ink in liquid form, or the like. The recording material saving mode may include a plurality of modes. In particular, it may include a plurality of modes in which the amount of use of the recording material differs from one mode to another. A normal mode, which is a mode that is not the recording material saving mode, may also include a plurality of modes. If the above recording material includes a recording material for each of a plurality of colors, the processing of the recording material saving mode according to an aspect of the invention may be performed for each of the colors. If the above recording material includes a recording material for each of a plurality of colors, the processing of the recording material saving mode according to an aspect of the invention may be performed for some of the colors only, for example, one color or two colors only. When monochrome printing is performed, the processing of the recording material saving mode according to an aspect of the invention may be performed for achromatic color only.

It is preferable that the recording-material-saving correspondence should be a conversion table that contains tone values in levels of N2 selected out of tone values of the output image data having the N3 tones; and, in the conversion table, each of the N2 selected tone values for the output image data having the N3 tones should be associated with the corresponding one of the tone values of the intermediate image data having the N2 tones. Since the available levels of the tone values of the output image data supplied to the printing unit/section are made greater in the recording material saving mode, it is possible to maintain picture quality as much as possible with a simple configuration.

It is preferable that the correspondence prescribing section should further have a normal correspondence that is used in a normal mode for forming the output image by using normal amount of the recording material. Preferably, the normal correspondence should prescribe correspondence between the tone values of the intermediate image data having the N2 tones and tone values of the output image data having the N3 tones. It is preferable that the image processing controller should further include a normal image processing section. In the normal mode, preferably, the normal image processing section should perform the screen processing on the input image data having the N1 tones to generate the intermediate image data having the N2 tones, convert the intermediate image data having the N2 tones into the output image data having the N3 tones according to the normal correspondence, and then supply the output image data to the printing unit. By this means, it is possible to generate the output image data in the normal mode and the recording material saving mode with a simple switchover between the normal correspondence between tone values of the intermediate image data having the N2 tones and tone values of the output image data having the N3 tones and the recording-material-saving correspondence between tone values of the intermediate image data having the N2 tones and tone values of the output image data having the N3 tones without making the circuitry of a screen processing unit complex.

It is preferable that the image processing controller should further include a normal image processing section that performs, in a normal mode for forming the output image by using normal amount of the recording material, the screen processing for the normal mode on the input image data having the N1 tones to directly convert the input image data into the output image data having the N3 tones and then supplies the output image data to the printing unit. The above configuration provides a preferred configuration for image data conversion processing in the normal mode when a recording-material-saving correspondence(s) is prepared.

It is preferable that the recording-material-saving correspondence should include a plurality of recording-material-saving correspondences that are different from each other or one another, where the plurality of recording-material-saving correspondences are respectively associated with possible attributes of the input image data that are different from each other or one another. Preferably, the recording-material-saving image processing section should convert the intermediate image data having the N2 tones into the output image data having the N3 tones according to the recording-material-saving correspondence associated with the attribute of the input image data selectively between or out of the plurality of recording-material-saving correspondences. By this means, it is possible to obtain an output image in the recording material saving mode that corresponds to the attribute of an input image.

The plurality of recording-material-saving correspondences may include a recording-material-saving correspondence for character that is used when the attribute of the input image data is character and a recording-material-saving correspondence for non-character that is used when the attribute of the input image data is either graphic or photograph, or both. The recording-material-saving correspondence for non-character may prescribe smaller amount of the recording material to be used than that prescribed by the recording-material-saving correspondence for character. The recording-material-saving image processing section may convert the intermediate image data having the N2 tones into the output image data having the N3 tones according to the recording-material-saving correspondence for character when the attribute of the input image data is character. The recording-material-saving image processing section may convert the intermediate image data having the N2 tones into the output image data having the N3 tones according to the recording-material-saving correspondence for non-character when the attribute of the input image data is either graphic or photograph, or both. By this means, it is possible to obtain an output image in a preferred recording material saving mode, which corresponds to the type of an input image.

It is preferable that the printing unit/section should include a print engine that irradiates a photosensitive member with a laser beam in a pattern that is in accordance with the output image data to form the output image, a print engine that uses a light emitting diode array to emit light onto a photosensitive member in a pattern that is in accordance with the output image data to form the output image, or a print engine that discharges ink onto a print target medium in a pattern that is in accordance with the output image data to form the output image. The above configuration provides a preferred configuration for maintaining picture quality as much as possible in the recording material saving mode.

The above aspects of the invention can be applied to, without any limitation thereto, an image processing method that includes a recording-material-saving image processing step, a printing method that includes a recording-material-saving image processing step and a printing step, an image processing program for causing a computer to implement a recording-material-saving image processing function, a printing program for causing a computer to implement a recording-material-saving image processing function and a printing function, and a computer readable storage medium in which any of these programs is stored.

BRIEF DESCRIPTION OF THE DRAWINGS

The invention will be described with reference to the accompanying drawings, wherein like numbers reference like elements.

FIG. 4A is a diagram that schematically illustrates an example of a normal correspondence LUT1.

FIG. 4B is a diagram that schematically illustrates an example of a recording-material-saving correspondence LUT2 for non-characters.

FIG. 4C is a diagram that schematically illustrates an example of a recording-material-saving correspondence LUT3 for characters.

FIG. 7A is a diagram that schematically illustrates an example of a relationship between tone values before screen processing and tone values after screen processing in a recording material saving mode.

FIG. 7B is a diagram that schematically illustrates an example of a relationship between tone values before tone conversion processing and tone values after tone conversion processing in a recording material saving mode.

DESCRIPTION OF EXEMPLARY EMBODIMENTS

1. Configuration of Printing Apparatus According to First Embodiment

Figure 1:
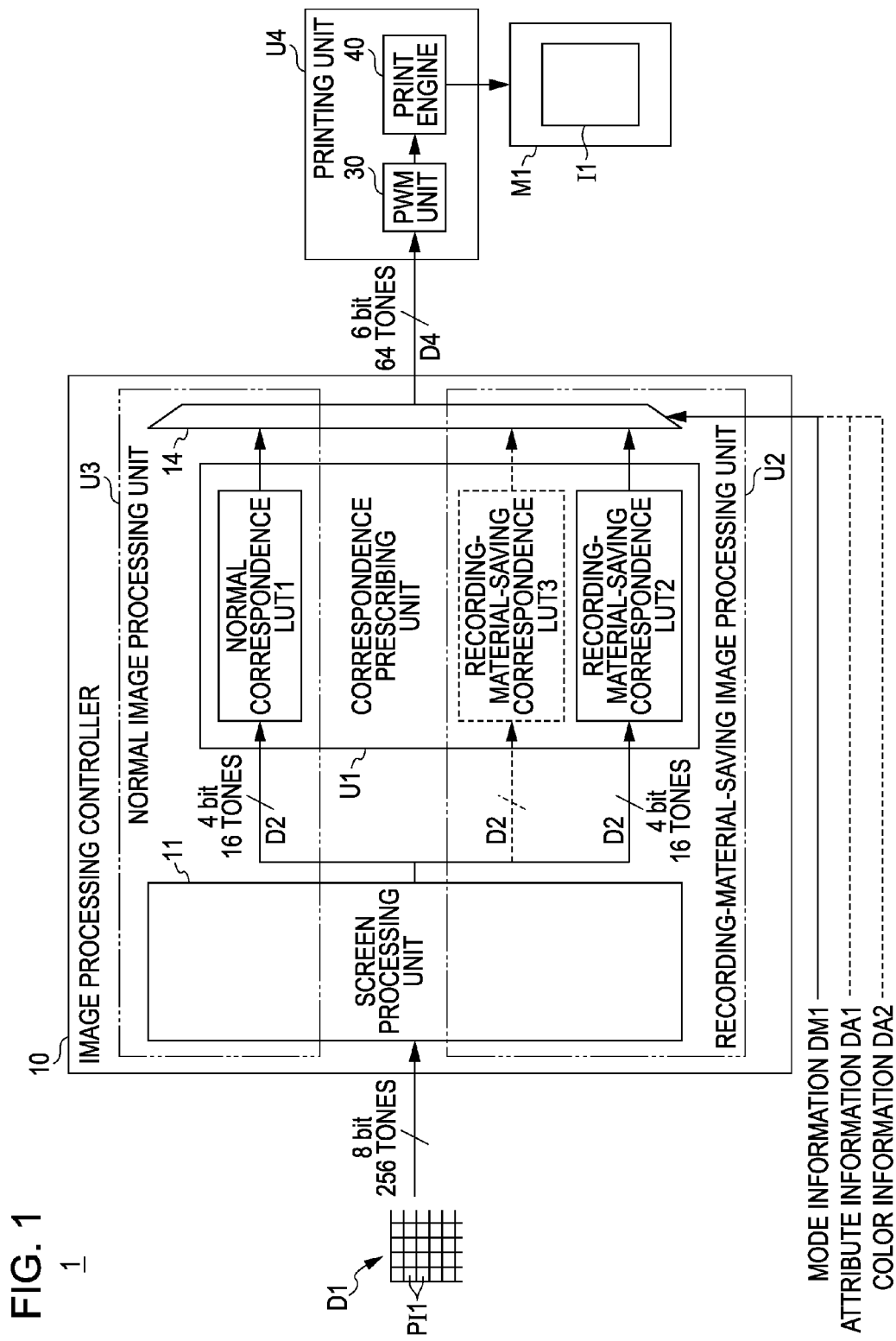
FIG. 1 is a block diagram that schematically illustrates an example of the configuration of a printing apparatus according to a first embodiment of the invention.

As illustrated in FIG. 1, a printing apparatus 1 according to a first embodiment of the invention includes an image processing controller 10 and a printing unit U4. Image data D1 having a tone value in N1 grayscale levels (N1 tones) (where N1 is an integer that is greater than or equal to four) in each of a plurality of pixels PI1 is inputted into the image processing controller 10. The printing unit U4 outputs a print image. The printing apparatus 1 according to the present embodiment of the invention is a laser printer. The laser printer can output a color print image as a page printer.

Figure 2:
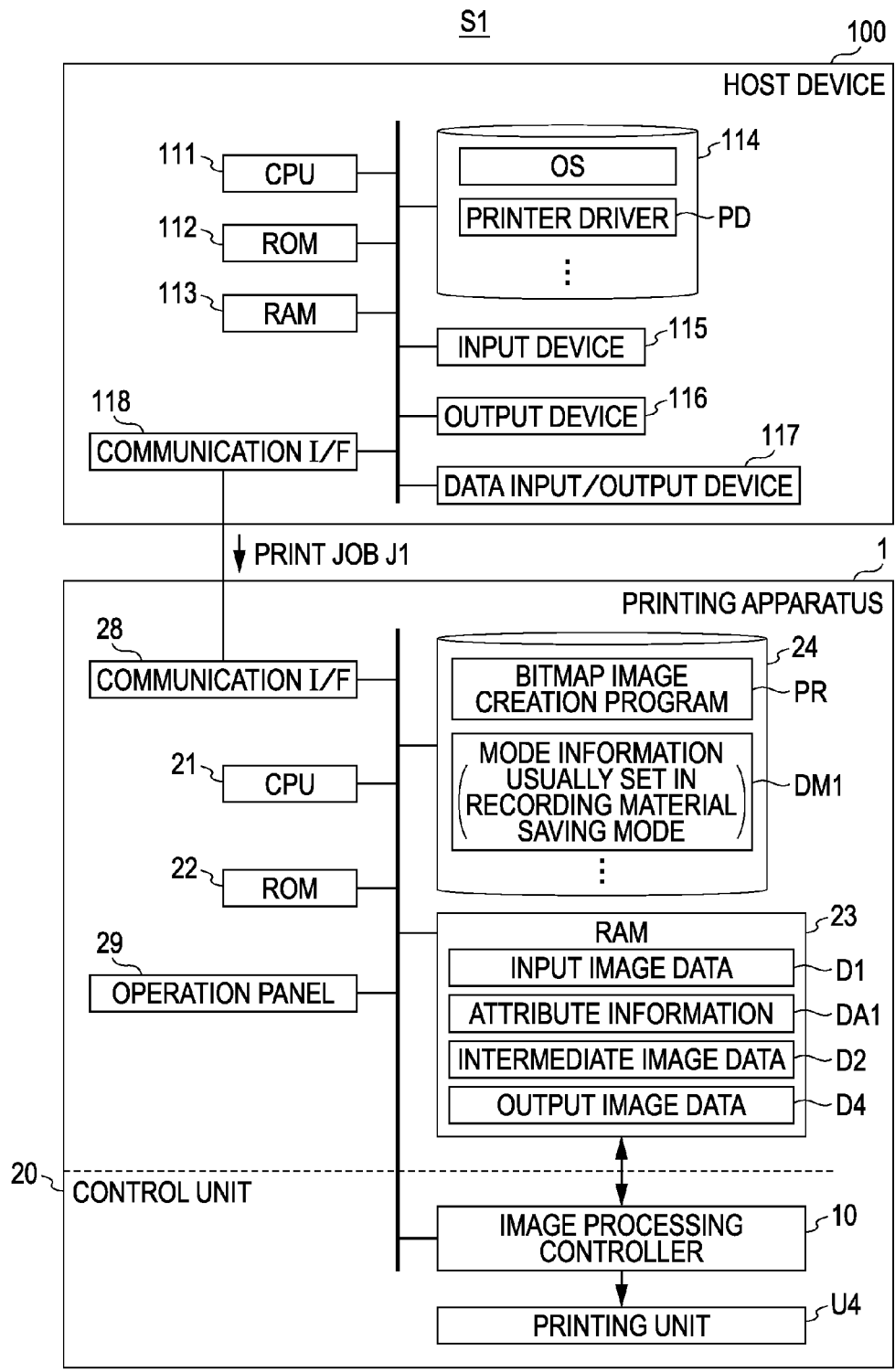
FIG. 2 is a block diagram that schematically illustrates an example of the configuration of an image formation system.

FIG. 2 shows an image formation system S1 that includes the printing apparatus 1 and a host device 100. The host device 100 is connected to the printing apparatus 1. The host device 100 and the printing apparatus 1 may be configured as a single integrated host-print apparatus. The host device 100 is a host computer that supplies a print job J1 to the printing apparatus 1. An example of the host device 100 is a personal computer. The host device 100 includes a CPU (Central Processing Unit) 111, semiconductor memories 112 and 113, a storage device 114, an input device 115, an output device 116, a data input/output device 117, a communication interface (I/F) 118, and the like. These components are interconnected via a bus for internal data transfer therebetween. An operating system (OS), a printer driver PD, and the like are stored in the storage device 114. The input device 115 is a set of devices operated by a user for inputting information. Examples of the input device 115 are a keyboard and a pointing device. The output device 116 is a set of devices including a video output device such as a display, an audio output device, and the like. A computer readable recording medium can be inserted into a slot of the data input/output device 117 as a removable medium. The data input/output device 117 can read data out of the recording medium and write data into the recording medium. The communication I/F 118 of the host device 100 is connected to a communication I/F 28 of the printing apparatus 1. Information is sent from the host device 100 to the printing apparatus 1 and from the printing apparatus 1 to the host device 100 via these communication interfaces.

Figure 3:
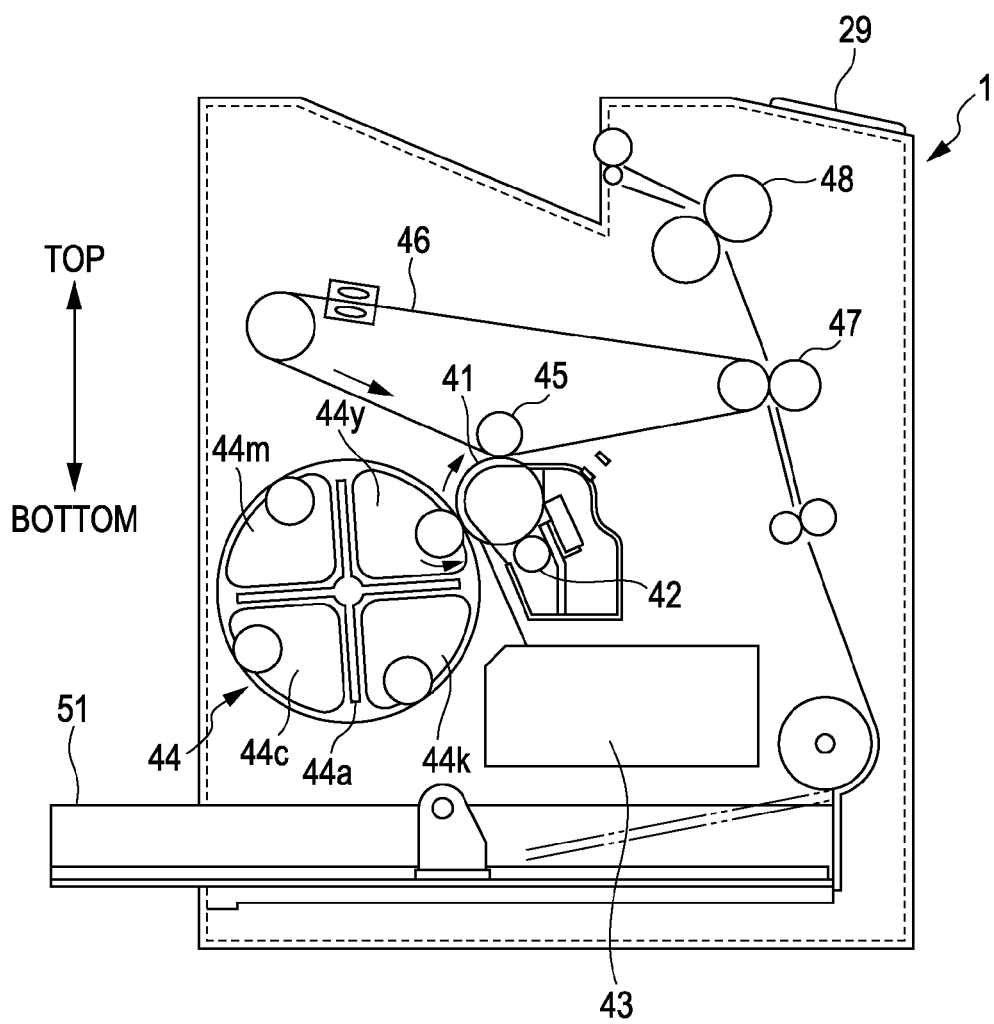
FIG. 3 is a diagram that schematically illustrates an example of the configuration of a print engine of the printing apparatus.

The printing apparatus 1 illustrated in FIGS. 1, 2, and 3 prints a color image on a print target medium by using a cyan (C) toner, a magenta (M) toner, a yellow (Y) toner, and a black (K) toner. These toners stick to the surface of the print target medium. The printing apparatus 1 outputs a print image in accordance with a command that is contained in the print job J1. The print job J1 is described in a predetermined page description language. The printing apparatus 1 includes a control unit 20, a PWM (Pulse Width Modulation) unit 30, a print engine 40, a paper-feed tray 51, and the like in addition to the image processing controller 10 mentioned above. The control unit 20 includes a CPU 21, semiconductor memories 22 and 23, a storage device 24, an operation panel 29, and the like in addition to the communication I/F 28 mentioned above. These components are interconnected via a bus for internal data transfer therebetween.

The CPU 21 controls the entire operation of the printing apparatus 1 in accordance with programs stored in the ROM (Read Only Memory) 22 and the storage device 24. Input image data D1, which is inputted into the image processing controller 10, intermediate image data D2, and output image data D4, which is outputted from the image processing controller 10, are stored in the RAM (Random Access Memory) 23. The input image data D1 according to the present embodiment of the invention is data that has a tone value in each of the plurality of pixels PI1 arranged in a regular dot matrix. As schematically illustrated in FIG. 1, the dot matrix of the input image data D1 has rows each of which extends in the X direction (i.e., horizontal direction) and columns each of which extends in the Y direction (i.e., vertical direction). The same holds true for the intermediate image data D2 and the output image data D4. A hard disk (magnetic disk), a non-volatile semiconductor memory, and the like can be used as memories that make up the storage device 24. A bitmap image creation program PR is stored in the storage device 24. The bitmap image creation program PR causes a computer to implement the function of generating the input image data D1 on the basis of the print job J1. The input image data D1 generated by the computer is used as source data for forming an output image I1 by arranging dots. To offer more than one print mode, mode information DM1 indicating the current mode of printing is stored in the memory 23, 24 (e.g., storage device 24) of the control unit 20. The mode information DM1 indicates whether the current mode is a mode of decimating some dots of the output image I1 or not. The communication I/F 28 is an interface through which the printing apparatus 1 can send information to the host device 100 and receive information from the host device 100. When the communication I/F 28 functions as a receiving interface, the printing apparatus 1 receives the print job J1 from the host device 100.

The operation panel 29 includes an input device such as an operating switch and an output device such as a liquid crystal display. The printing apparatus 1 allows a user to pre-select either a normal mode or a toner save mode as its default print mode by operating the operation panel 29. The information inputted by the user for pre-selection between the modes is stored in the memory 23, 24 as the mode information DM1. Through the above input memory operation, the print mode indicated by the mode information DM1 stored in the memory 23, 24 is preset as the default print mode of the printing apparatus 1. Accordingly, if the print job J1 received through the communication I/F 28 does not contain any information that indicates a job-specific print mode, the printing apparatus 1 performs print operation in the default print mode indicated by the mode information DM1. The control unit 20 interprets a print command contained in the print job J1 for bitmapping, thereby preparing the input image data D1. The input image data D1 represents a bitmap image. The print command is provided for each type of an object such as characters, vector graphics, a photograph, and the like. When performing bitmapping, the control unit 20 generates attribute information DA1 and stores it into the RAM 23. The attribute information DA1 indicates the object type for each of the plurality of pixels PI1 of the input image data D1. As with the input image data D1, the attribute information DA1 is data that has a tone value in each of the plurality of pixels PI1 arranged in a regular dot matrix, which has rows each of which extends in the X direction (i.e., horizontal direction) and columns each of which extends in the Y direction (i.e., vertical direction).

The image processing controller 10 performs screen processing for "tone-reducing" the input image data D1 having N1 grayscale levels (N1 tones) into the intermediate image data D2 having N2 grayscale levels (N2 tones) (where N2 is an integer that is greater than or equal to three but less than N1) and then generates the output image data D4. The output image data D4 is supplied to the printing unit U4. The printing unit U4 can form the output image I1 with the use of a recording material in accordance with the output image data D4. The output image data D4 is data having N3 grayscale levels (N3 tones), where N3 is an integer that is greater than N2, meaning that the output image data D4 has grayscale levels greater than those of the intermediate image data D2 (N2 grayscale levels) generated as a result of the screen processing performed on the input image data D1. The present embodiment of the invention is premised on the above relationship in grayscale levels (tones). The screen processing is halftone processing for converting input image data into many-valued data that is suited for dot formation. Generally, screen processing includes binarization for converting the value of each pixel into either zero or one. However, since binary image data does not contain halftone information, it is difficult to maintain picture quality when forming an output image. In contrast, the screen processing applied to the present embodiment of the invention is many-valued-data (multilevel-data) output processing. Therefore, there are three or more grayscale levels for each pixel in the data even after the screen processing. Therefore, halftone is reproduced for each pixel in an image represented by the image data after the multilevel outputting.

The image processing controller 10 includes a correspondence prescribing unit U1 and a recording-material-saving image processing unit U2 as its basic components. A recording-material-saving correspondence lookup table LUT2, which is used in the toner save mode (recording material saving mode) for forming the output image I1 while saving toner (recording material), is stored in the correspondence prescribing unit U1. The recording-material-saving image processing unit U2 performs screen processing on the input image data D1 having the N1 grayscale levels to generate the intermediate image data D2 having the N2 grayscale levels ($3 \leq N2 < N1$). Then, the recording-material-saving image processing unit U2 looks up its recording-material-saving correspondence lookup table LUT2 to convert the intermediate image data D2 having the N2 grayscale levels into the output image data D4 having the N3 grayscale levels ($N3 > N2$). Thereafter, the recording-material-saving image processing unit U2 supplies the output image data D4 to the printing unit U4. The recording-material-saving correspondence lookup table LUT2 prescribes correspondence between tone values of the intermediate image data D2 having the N2 grayscale levels and tone values of the output image data D4 having the N3 grayscale levels.

The image processing controller 10 according to the present embodiment of the invention is ASIC (Application Specific Integrated Circuit). Needless to say, however, the image processing controller 10 is not limited to an ASIC. For example, it may be a microcomputer or the like. A buffer(s) such as, for example, an SRAM (Static Random Access Memory) can be used as the correspondence prescribing unit U1.

FIG. 4B is a diagram that schematically illustrates an example of the recording-material-saving correspondence lookup table LUT2 according to an exemplary embodiment of the invention. The recording-material-saving correspondence lookup table LUT2 is a single-dimensional conversion table that contains N2-level tone values selected out of the tone values of the output image data D4 having the N3 grayscale levels. In the recording-material-saving correspondence lookup table LUT2, each of the N2 pre-selected tone values for the output image data D4 having the N3 grayscale levels is associated with the corresponding one of the tone values of the intermediate image data D2 having the N2 grayscale levels. In the illustrated example of FIG. 4B, N2 is 16 (N2=16)); accordingly, sixteen pre-selected tone values for the output image data D4 are contained in the recording-material-saving correspondence lookup table LUT2. In the present embodiment of the invention, since the tone values of the intermediate image data D2 having the N2 grayscale are predetermined as $0, 1, \ldots, N2-1$, they are not contained in the recording-material-saving correspondence lookup table LUT2. Needless to say, however, the tone values of the intermediate image data D2 may be contained in the recording-material-saving correspondence lookup table LUT2.

Let a tone value of the intermediate image data D2 be denoted as "i" (where i is an integer ranging from 0 inclusive to $N2-1$ inclusive). Let a tone value of the output image data D4 associated with the tone value i of the intermediate image data D2 be denoted as GOi ($0 \leq GOi \leq N3-1$). Upon receiving an input of the tone value i of the intermediate image data D2 for a certain pixel internally from a screen processing unit 11, the recording-material-saving image processing unit U2 according to the present embodiment of the invention looks up its recording-material-saving correspondence lookup table LUT2 to convert the tone value i of the intermediate image data D2 into the tone value GOi of the output image data D4. Then, the recording-material-saving image processing unit U2 outputs it to the printing unit U4 through an output switcher 14. Therefore, since the available levels (i.e., possible levels) of the tone values of the output image data D4 supplied to the printing unit U4 are made greater in a recording material saving mode, it is possible to maintain picture quality as much as possible with a simple configuration.

Besides the recording-material-saving correspondence lookup table LUT2, a normal correspondence lookup table LUT1, which is used in the normal mode for forming the output image I1 by using the normal amount of toner, is stored in the correspondence prescribing unit U1 according to the present embodiment of the invention. The image processing controller 10 according to the present embodiment of the invention includes a normal image processing unit U3 besides the recording-material-saving image processing unit U2. The normal image processing unit U3 uses the normal correspondence lookup table LUT1 for converting the intermediate image data D2 into the output image data D4. In the normal mode, the normal image processing unit U3 performs screen processing on the input image data D1 having the N1 grayscale levels to generate the intermediate image data D2 having the N2 grayscale levels. Then, the normal image processing unit U3 looks up its normal correspondence lookup table LUT1 to convert the intermediate image data D2 having the N2 grayscale levels into the output image data D4 having the N3 grayscale levels. Thereafter, the normal image processing unit U3 supplies the output image data D4 to the printing unit U4. The normal correspondence lookup table LUT1 prescribes correspondence between tone values of the intermediate image data D2 having the N2 grayscale levels and tone values of the output image data D4 having the N3 grayscale levels.

FIG. 4A is a diagram that schematically illustrates an example of the normal correspondence lookup table LUT1 according to an exemplary embodiment of the invention. As with the recording-material-saving correspondence lookup table LUT2, the normal correspondence lookup table LUT1 is a single-dimensional conversion table that contains N2-level tone values selected out of the tone values of the output image data D4 having the N3 grayscale levels. In the normal correspondence lookup table LUT1, each of the N2 pre-selected tone values for the output image data D4 having the N3 grayscale levels is associated with the corresponding one of the tone values of the intermediate image data D2 having the N2 grayscale levels. In the normal mode, in order to utilize the maximum range of tone reproduction, the maximum tone value 63 (=N3−1) of the output image data D4 is associated with the maximum tone value 15 (=N2−1) of the intermediate image data D2. In the present embodiment of the invention, the correspondence contained in the normal correspondence lookup table LUT1 prescribes a relationship between tone values before conversion and tone values after conversion when the amount of toner used is normal.

Upon receiving an input of the tone value i of the intermediate image data D2 for a certain pixel internally from the screen processing unit 11, the normal image processing unit U3 according to the present embodiment of the invention looks up its normal correspondence lookup table LUT1 to convert the tone value i of the intermediate image data D2 into the tone value GOi of the output image data D4. Then, the normal image processing unit U3 outputs it to the printing unit U4 through the output switcher 14. Therefore, it is possible to generate the output image data D4 in the normal mode and the toner save mode simply by switching between the normal correspondence lookup table LUT1 and the recording-material-saving correspondence lookup table LUT2 without making the circuitry of the screen processing unit 11 complex.

As illustrated in FIG. 1, in the present embodiment of the invention, the input image data D1 contains 8-bit tone information in 256 grayscale levels. The intermediate image data D2 contains 4-bit tone information in 16 grayscale levels. The output image data D4 contains 6-bit tone information in 64 grayscale levels. The output image data D4 is inputted into the PWM unit 30 of the printing unit U4. In the buffers in which the lookup tables LUT1 and LUT2 are stored, the tone values of the output image data D4 are stored at addresses expressed by the 4-bit information of the intermediate image data D2. Under the control of the control unit 20, the mode information DM1 is outputted to the image processing controller 10.

When the mode information DM1 indicates the normal mode, the screen processing unit 11 performs screen processing on the 8-bit image data D1 inputted from the RAM 23 to generate the intermediate image data D2 containing 4-bit information, which is supplied as an address signal to the buffer in which the normal correspondence lookup table LUT1 is stored. The buffer outputs, as a data signal, the tone value of the output image data D4 that is stored at an address expressed by the 4-bit information of the intermediate image data D2. The mode information DM1 is inputted into the output switcher 14. When the mode information DM1 indicates the normal mode, the output switcher 14 selects an output obtained from the normal correspondence lookup table LUT1 for the input signal. That is, the output switcher 14 supplies the output image data D4 obtained from the normal correspondence lookup table LUT1 to the PWM unit 30. On the other hand, when the mode information DM1 indicates the toner save mode, the screen processing unit 11 performs screen processing on the 8-bit image data D1 inputted from the RAM 23 to generate the intermediate image data D2 containing 4-bit information, which is supplied as an address signal to the buffer in which the recording-material-saving correspondence lookup table LUT2 is stored. The buffer outputs, as a data signal, the tone value of the output image data D4 that is stored at an address expressed by the 4-bit information of the intermediate image data D2. Since the intermediate image data D2 in the toner save mode has 16 grayscale levels, that is, the same grayscale levels as those of the intermediate image data D2 in the normal mode, it is possible to perform screen processing in the toner save mode in the same manner as in the normal mode. Notwithstanding the above, however, screen processing in the toner save mode may be different from screen processing in the normal mode. When the mode information DM1 indicates the toner save mode, the output switcher 14 selects an output obtained from the recording-material-saving correspondence lookup table LUT2 for the input signal. That is, the output switcher 14 supplies the output image data D4 obtained from the recording-material-saving correspondence lookup table LUT2 to the PWM unit 30.

The printing unit U4 forms the output image I1 by using toner in accordance with the output image data D4 having the N3 grayscale levels (N3>N2). The printing unit U4 according to the present embodiment of the invention includes the PWM unit 30 and the print engine 40. The print engine 40 irradiates a photosensitive member 41 with a laser beam in a pattern that is in accordance with the output image data D4 supplied from the image processing controller 10, thereby forming the output image I1 on a print target medium M1. The output image data D4 having the N3 grayscale levels is inputted into the PWM unit 30. The PWM unit 30 converts the output image data D4 into a pulse signal that is suited for laser-beam dot formation. The PWM unit 30 outputs the pulse signal to the print engine 40. The pulse signal contains the N3 grayscale information of the output image data D4 not only in the normal mode but also in the toner save mode. Therefore, the pulse signal enables the image I1 to be outputted with N3 grayscale reproduction.

An example of the configuration of the printing apparatus 1 according to the present embodiment of the invention is illustrated in FIG. 3. The printing apparatus 1 includes the photosensitive member 41, an electrification unit 42, a light exposure unit 43, a YMCK development device 44, a primary image transfer unit 45, an intermediary image transfer belt 46, a secondary image transfer unit 47, an image fixation unit 48, the control unit 20, and the like. The units 42 to 46 are arranged along the direction of rotation of the photosensitive member 41. The control unit 20 controls these units so as to control the entire operation of the printing apparatus 1. The electrification unit 42 electrifies the photosensitive member 41 in accordance with the control of the control unit 20. The light exposure unit 43 emits a laser beam in accordance with the control of the control unit 20 to form a latent image on the electrified photosensitive member 41.

The YMCK development device 44 includes a rotary 44a, which is a rotating member, and a black development unit 44k, a magenta development unit 44m, a cyan development unit 44c, and a yellow development unit 44y, which are attached to the rotary 44a. The YMCK development device 44 is driven to rotate in accordance with the control of the control unit 20. Driven to rotate in accordance with the control of the control unit 20, the primary image transfer unit 45 transfers a unicolor toner image formed on the photosensitive member 41 onto the intermediary image transfer belt 46. Toner images (i.e., unicolor images) of the four colors are transferred onto the intermediary image transfer belt 46 one on another. As a result, a full-color toner image is formed on the intermediary image transfer belt 46. Driven to rotate in accordance with the control of the control unit 20, the secondary image transfer unit 47 transfers the full-color toner image or the unicolor toner image, which has been formed on the intermediary image transfer belt 46, onto the print target medium M1. Examples of the print target medium M1 are paper, film, or cloth.

Driven to rotate in accordance with the control of the control unit 20, the image fixation unit 48 "fusion-bonds" the full-color toner image or the unicolor toner image, which has been transferred onto the print target medium M1, to the print target medium M1. In this way, the image fixation unit 48 turns the image into a durable image. The image fixation unit 48 is provided with a heater. Sheets of the print target medium M1 are stacked in the paper-feed tray 51. The print target medium M1 is picked up from the paper-feed tray 51 to be transported to the position of the secondary image transfer unit 47. The toner image is transferred onto the print target medium M1 by the secondary image transfer unit 47. Then, the print target medium M1 is transported to the position of the image fixation unit 48. The image fixation unit 48 applies heat and pressure to the print target medium M1 so as to form the output image I1 thereon. The output image I1 is an image that corresponds to an input image represented by the input image data D1 and an intermediate image represented by the intermediate image data D2. The output image I1 is an image represented by the output image data D4. The output image I1 exhibits no gradation loss not only in the normal mode but also in the toner save mode. Thus, the N3 grayscale information of the output image data D4 can be reproduced (i.e., expressed) in both of these modes.

As illustrated in FIGS. 4B and 4C, a plurality of recording-material-saving correspondence lookup tables corresponding to the attributes of an input image may be prepared. The content of the recording-material-saving correspondence lookup table LUT2 is different from that of a recording-material-saving correspondence lookup table LUT3. These correspondences are respectively associated with the possible attributes of the input image data D1. The attributes are different from each other. Examples of the attributes are character, graphic, and photograph. Making selection between the recording-material-saving correspondence lookup tables LUT2 and LUT3 depending on the attribute of the input image data D1, the recording-material-saving image processing unit U2 looks up the corresponding recording-material-saving correspondence lookup table to convert the intermediate image data D2 having the N2 grayscale levels into the output image data D4 having the N3 grayscale levels. By this means, it is possible to obtain the output image I1 in the recording material saving mode that corresponds to the attribute of an input image.

The recording-material-saving correspondence lookup table LUT3 illustrated in FIG. 4C contains a recording-material-saving correspondence that is to be applied to characters (hereinafter referred to as "recording-material-saving correspondence for characters"). The recording-material-saving correspondence for characters is used when the attribute of the input image data D1 is character. On the other hand, the recording-material-saving correspondence lookup table LUT2 illustrated in FIG. 4B contains a recording-material-saving correspondence that is to be applied to either a graphic object or a photograph, or both (hereinafter referred to as "recording-material-saving correspondence for non-characters"). The recording-material-saving correspondence for non-characters is used when the attribute of the input image data D1 is not character. Notwithstanding the above, however, the recording-material-saving correspondence that is to be applied to a graphic object may be different from the recording-material-saving correspondence that is to be applied to a photograph. Another recording-material-saving correspondence that is different from those contained in the recording-material-saving correspondence lookup tables LUT2 and LUT3 may be prepared for an attribute other than character, graphic, and photograph.

Figure 5:
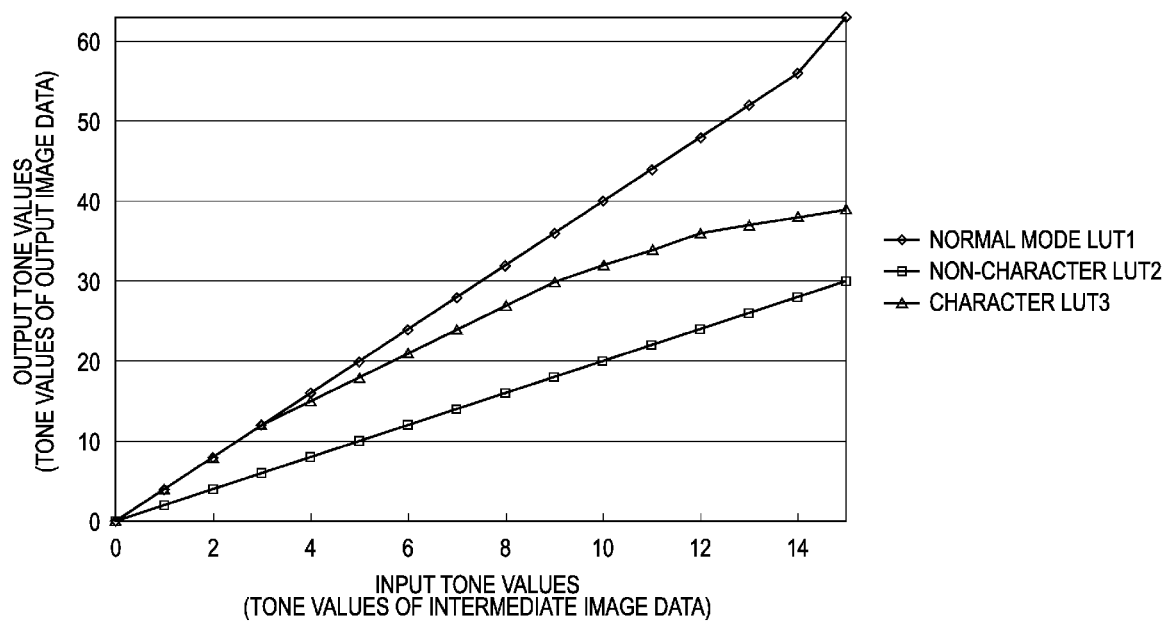
FIG. 5 is a diagram that shows an example of the characteristics of the correspondences LUT1, LUT2, and LUT3.

FIG. 5 is a graph that shows an example of a relationship between tone values before conversion and tone values after conversion for each of the correspondence lookup tables LUT1, LUT2, and LUT3 according to an exemplary embodiment of the invention. Each of the output tone values of the recording-material-saving correspondence lookup tables LUT2 and LUT3 (i.e., the tone values of the output image data D4) is smaller than the corresponding one of the output tone values of the normal correspondence lookup table LUT1. In addition, each of the output tone values of the lookup table LUT3 containing the recording-material-saving correspondence for characters is larger than the corresponding one of the output tone values of the lookup table LUT2 containing the recording-material-saving correspondence for non-characters. In other words, the recording-material-saving correspondence for non-characters, which is contained in the lookup table LUT2, prescribes smaller amount of a recording material to be used than that prescribed by the recording-material-saving correspondence for characters, which is contained in the lookup table LUT3. Moreover, the relationship for the lookup table LUT2 containing the recording-material-saving correspondence for non-characters is linear, whereas the relationship for the lookup table LUT3 containing the recording-material-saving correspondence for characters is non-linear, more specifically, can be expressed as a gentle curve that is convex upward. If the attribute of the input image data D1 is character, printing is performed while saving toner moderately in order to make the printed characters sharp and clear. In addition, the toner-saving function is disabled to ensure sharpness and clearness if the input tone value is small. If the attribute of the input image data D1 is either graphic or photograph, or both, it is less necessary to ensure sharpness and clearness in a print output in comparison with a case of characters. In addition, in most cases, the print area of a graphic object or a photograph is wider than that of characters. For these reasons, the saving amount of toner is larger.

The recording-material-saving image processing unit U2 looks up its table LUT3, which contains the recording-material-saving correspondence for characters, to convert the intermediate image data D2 having the N2 grayscale levels into the output image data D4 having the N3 grayscale levels when the attribute of the input image data D1 is character. The recording-material-saving image processing unit U2 looks up its table LUT2, which contains the recording-material-saving correspondence for non-characters, to convert the intermediate image data D2 having the N2 grayscale levels into the output image data D4 having the N3 grayscale levels when the attribute of the input image data D1 is either graphic or photograph, or both. By this means, it is possible to obtain the output image I1 in a preferred recording material saving mode, which corresponds to the type of an input image.

Figure 6:
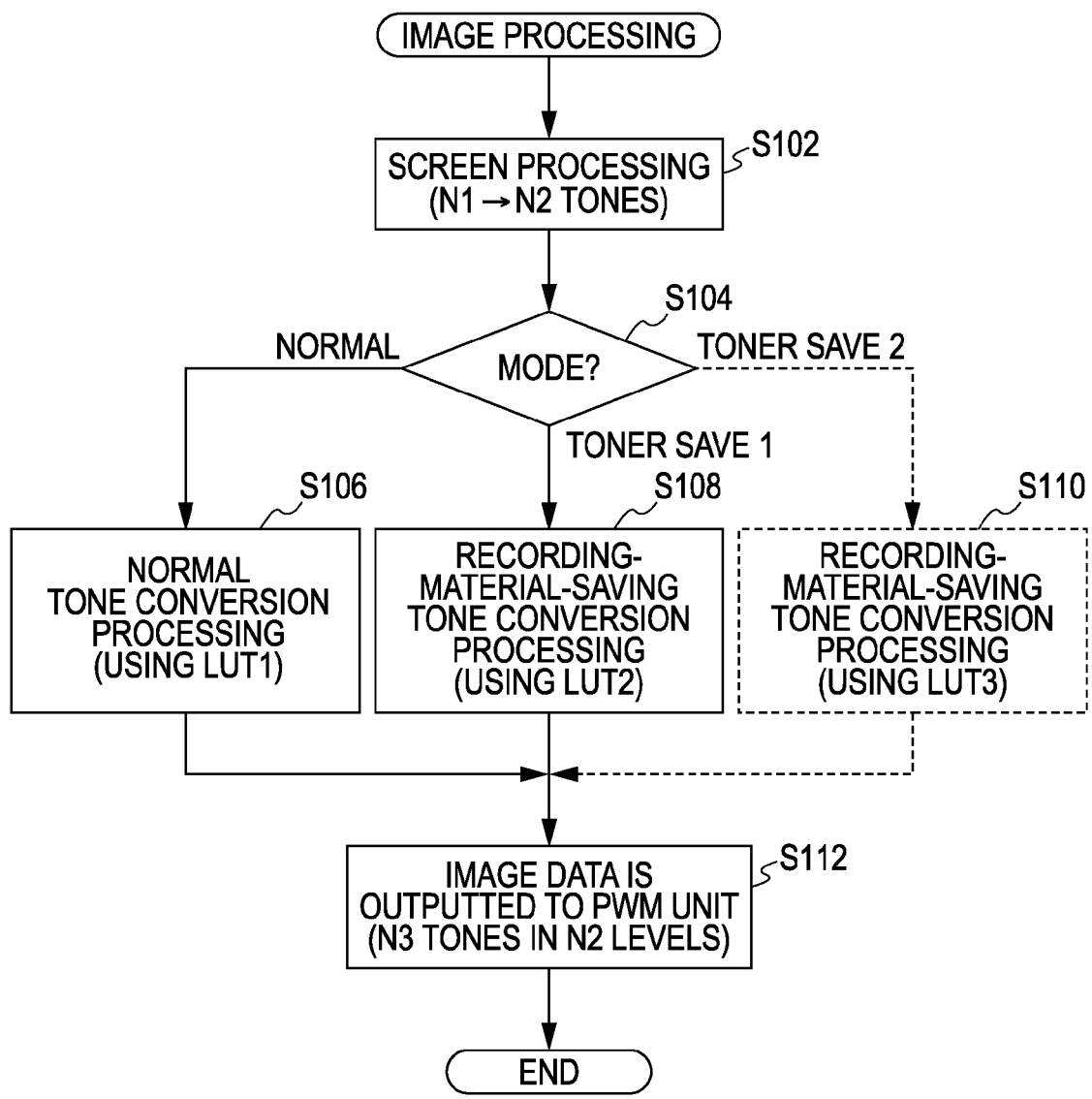
FIG. 6 is a flowchart that schematically illustrates an example of image processing controlled by an image processing controller according to the first embodiment of the invention.

2. Operation and Working Effects of Image Processing Controller According to First Embodiment FIG. 6 is a flowchart that schematically illustrates an example of image processing controlled by an image processing controller according to a first embodiment of the invention. Steps S102, S108, S110, and S112 correspond to the operation of the recording-material-saving image processing unit U2. Steps S102, S106, and S112 correspond to the operation of the normal image processing unit U3. FIG. 7A is a diagram that schematically illustrates an example of a relationship between tone values before screen processing and tone values after screen processing in the recording material saving mode according to an exemplary embodiment of the invention. FIG. 7B is a diagram that schematically illustrates an example of a relationship between tone values before tone conversion processing and tone values after tone conversion processing performed while looking up the recording-material-saving correspondence lookup table LUT2 according to an exemplary embodiment of the invention. With reference to these drawings, the operation of the image processing controller 10 as well as its working effects will now be explained.

Upon receiving an input of the input image data D1 having the N1 grayscale levels from the RAM 23, the image processing controller 10 performs screen processing, which is the same processing irrespective of a print mode, at the screen processing unit 11. As a result of the screen processing, the intermediate image data D2 having the N2 grayscale levels ($3 \leq N2 < N1$) is generated (step S102). The "step" may be omitted hereinafter. Even in the toner save mode, the intermediate image data D2 having the N2 grayscale levels (e.g., 16 grayscale levels), which are the same as those in the normal mode, is generated as illustrated in FIG. 7A. The mode information DM1 is inputted into the output switcher 14. In S104, depending on the print mode indicated by the mode information DM1, the process proceeds to the corresponding branch.

Figure 14A:
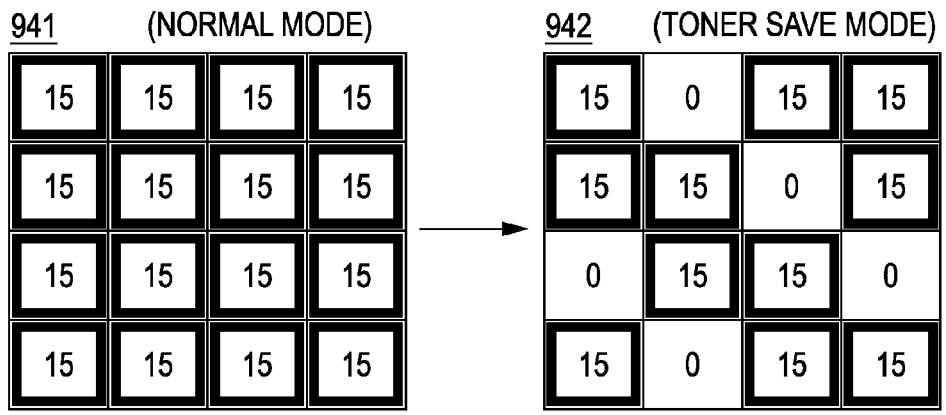
FIG. 14A is a diagram that schematically illustrates an example of dots formed at the time of screen processing in a method of decimating dots.
Figure 14B:
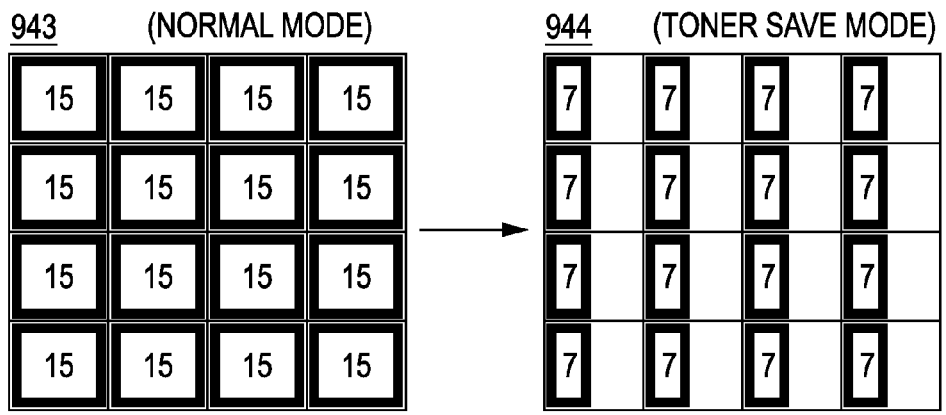
FIG. 14B is a diagram that schematically illustrates an example of dots formed at the time of screen processing in a method of reducing the tone value of output image data.
Figure 14C:
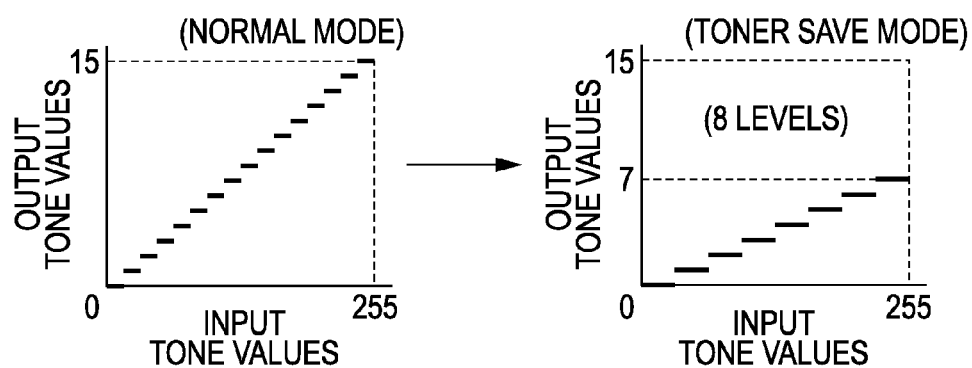
FIG. 14C is a diagram that schematically illustrates an example of correspondences between the tone values of input image data and the tone values of output image data.

If the indicated print mode is the normal mode, the normal image processing unit U3 looks up its normal correspondence lookup table LUT1 to convert the intermediate image data D2 having the N2 grayscale levels into the output image data D4 having the N3 grayscale levels ($N3>N2$) (S106). If the indicated print mode is the toner save mode, the recording-material-saving image processing unit U2 looks up its recording-material-saving correspondence lookup table LUT2 to convert the intermediate image data D2 having the N2 grayscale levels into the output image data D4 having the N3 grayscale levels (S108). In related art, as illustrated in FIG. 14C, an output can be expressed in the toner save mode in limited grayscale levels that are less in the number of levels than N2 (e.g., eight grayscale levels only, which correspond to the eight tone values of output image data), although the output can be expressed in the normal mode in the entirety of the N2 grayscale levels (e.g., 16 grayscale levels). In contrast, as illustrated in FIG. 7B, the image processing controller 10 according to the present embodiment of the invention can perform tone conversion processing to output the tone values of the output image data D4 while utilizing all of the N2 levels (e.g., 16 grayscale levels). Therefore, it is possible to make the available levels of the tone values of the output image data D4 greater than those of related art.

If there is a plurality of toner save modes, recording-material-saving correspondence lookup tables different from each other or one another may be used to generate the output image data D4, where each of the recording-material-saving correspondence lookup tables is prepared for the corresponding toner save mode. For example, let's assume that a first toner save mode is a print mode for either a graphic object or a photograph, or both, whereas a second toner save mode is a print mode for characters. If the indicated print mode is the first toner save mode, the recording-material-saving image processing unit U2 looks up the table LUT2 illustrated in FIG. 4B, which contains the recording-material-saving correspondence for non-characters, to convert the intermediate image data D2 having the N2 grayscale levels into the output image data D4 having the N3 grayscale levels (S108). If the indicated print mode is the second toner save mode, the recording-material-saving image processing unit U2 looks up the table LUT3 illustrated in FIG. 4C, which contains the recording-material-saving correspondence for characters, to convert the intermediate image data D2 having the N2 grayscale levels into the output image data D4 having the N3 grayscale levels (S110). Note that all processing in S106, S108, and S110 may be performed in parallel.

In S112, the output switcher 14 selects the output image data D4 that corresponds to the print mode indicated by the mode information DM1 and outputs the selected output image data D4 to the PWM unit 30. Even in the toner save mode, the output image data D4 has N3-tone values in N2 levels. The output image data D4 is converted into a pulse signal at the PWM unit 30. The pulse signal is supplied to the print engine 40. In this way, the output image I1 that corresponds to the output image data D4 having N2-level tone values is formed on the print target medium M1.

As explained above, the image processing controller 10 according to the present embodiment of the invention offers an advantage in that it is possible to make the available levels of the tone values of the output image data D4 supplied to the printing unit U4 greater in the toner save mode. Therefore, the output image I1 exhibits no gradation loss not only in the normal mode but also in the toner save mode, meaning that halftone information will not be sacrificed. Thus, it is possible to maintain picture quality.

3. Second Embodiment

Figure 8:
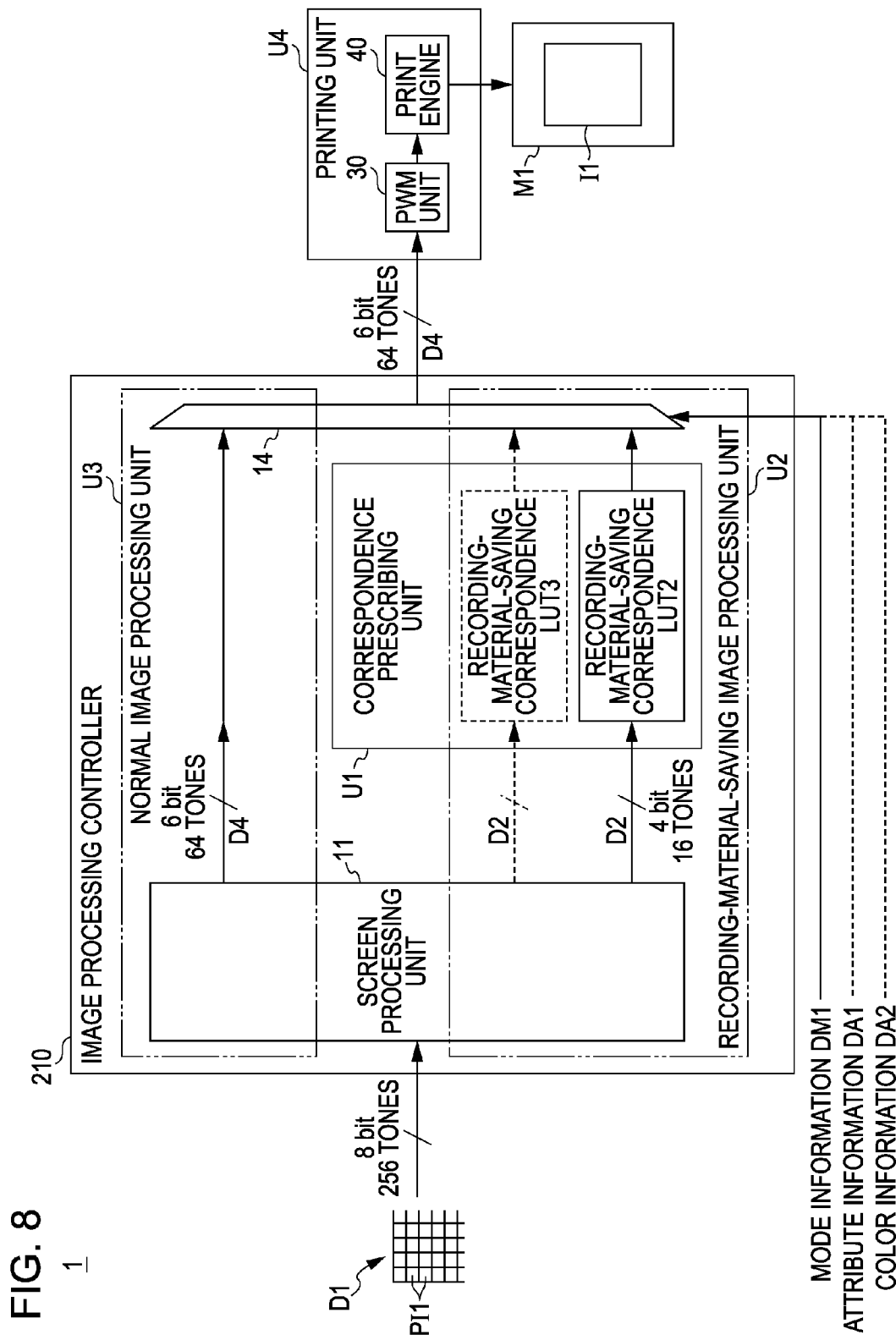
FIG. 8 is a block diagram that schematically illustrates an example of the configuration of a printing apparatus according to a second embodiment of the invention.

FIG. 8 is a diagram that schematically illustrates an example of the configuration of the printing apparatus 1 according to a second embodiment of the invention. The correspondence prescribing unit U1 according to the present embodiment of the invention does not include the normal correspondence lookup table LUT1. In the present embodiment of the invention, an image processing controller 210 performs screen processing in the normal mode and screen processing in the toner save mode differently from each other. The normal image processing unit U3 according to the present embodiment of the invention performs normal-mode screen processing on the input image data D1 having the N1 grayscale levels (e.g., 256 grayscale levels) to convert it into the output image data D4 having the N3 grayscale levels (e.g., 64 grayscale levels), which is supplied to the printing unit U4. Therefore, screen processing in the normal mode is processing for generating the output image data D4 having the N3 grayscale levels directly, whereas screen processing in the toner save mode is processing for generating the intermediate image data D2 having the N2 grayscale levels.

Figure 9:
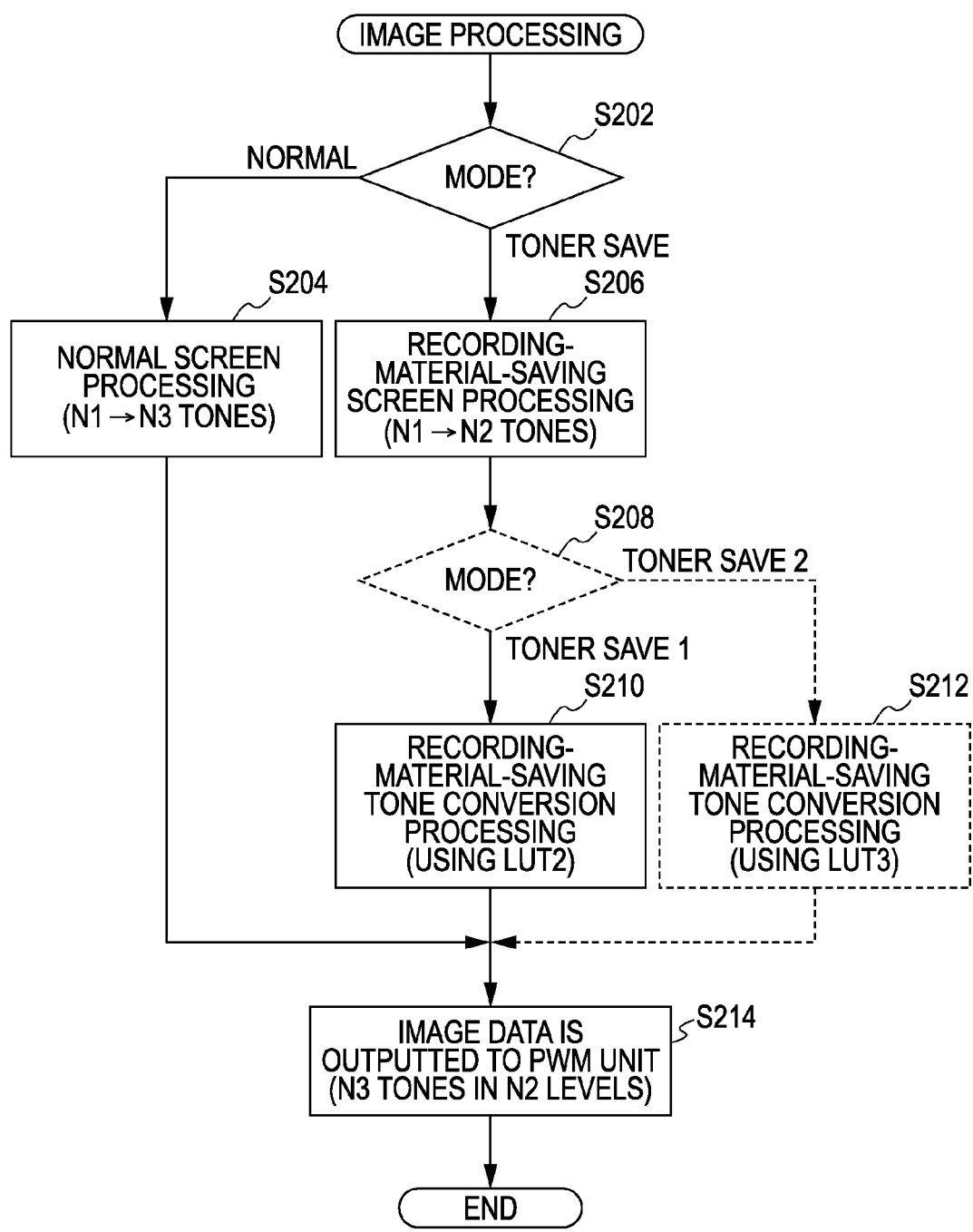
FIG. 9 is a flowchart that schematically illustrates an example of image processing controlled by an image processing controller according to the second embodiment of the invention.

FIG. 9 is a flowchart that schematically illustrates an example of image processing controlled by an image processing controller according to a second embodiment of the invention. Steps S206, S208 to S212, and S214 correspond to the operation of the recording-material-saving image processing unit U2. Steps S204 and S214 correspond to the operation of the normal image processing unit U3. With reference to FIG. 9, the operation of the image processing controller 210 as well as its working effects will now be explained. The input image data D1 having the N1 grayscale levels is inputted into the image processing controller 210. The mode information DM1 is inputted into the output switcher 14. Depending on whether the print mode indicated by the mode information DM1 is the normal mode or the toner save mode, the process proceeds to the corresponding branch (S202).

If the indicated print mode is the normal mode, the normal image processing unit U3 performs normal-mode screen processing on the input image data D1 having the N1 grayscale levels to generate the output image data D4 having the N3 grayscale levels (S204). If the indicated print mode is the toner save mode, the recording-material-saving image processing unit U2 performs toner-save-mode screen processing on the input image data D1 having the N1 grayscale levels to generate the intermediate image data D2 having the N2 grayscale levels (3≦N2<N1) (S206). Note that processing in S204 and S206 may be performed in parallel.

If there is a plurality of toner save modes, the process may be branched depending thereon (S208). That is, recording-material-saving correspondence lookup tables different from each other or one another may be used to generate the output image data D4, where each of the recording-material-saving correspondence lookup tables is prepared for the corresponding toner save mode. For example, if the indicated print mode is the first toner save mode, which is a print mode for either a graphic object or a photograph, or both, the recording-material-saving image processing unit U2 may look up the table LUT2 illustrated in FIG. 4B, which contains the recording-material-saving correspondence for non-characters, to convert the intermediate image data D2 having the N2 grayscale levels into the output image data D4 having the N3 grayscale levels (S210). If the indicated print mode is the second toner save mode, which is a print mode for characters, the recording-material-saving image processing unit U2 may look up the table LUT3 illustrated in FIG. 4C, which contains the recording-material-saving correspondence for characters, to convert the intermediate image data D2 having the N2 grayscale levels into the output image data D4 having the N3 grayscale levels (S212). Note that processing in S210 and S212 may be performed in parallel.

In S214, the output switcher 14 selects the output image data D4 that corresponds to the print mode indicated by the mode information DM1 and outputs the selected output image data D4 to the PWM unit 30. Even in the toner save mode, the output image data D4 has N3-tone values in N2 levels. Therefore, the output image I1 exhibits no gradation loss not only in the normal mode but also in the toner save mode, meaning that halftone information will not be sacrificed. Thus, it is possible to maintain picture quality. In the present embodiment of the invention, it is not necessary to prepare the normal correspondence lookup table LUT1 for the normal mode. Thus, the present embodiment of the invention provides a preferred configuration for image data conversion processing in the normal mode when a recording-material-saving correspondence lookup table(s) is prepared.

4. Third Embodiment

Figure 10:
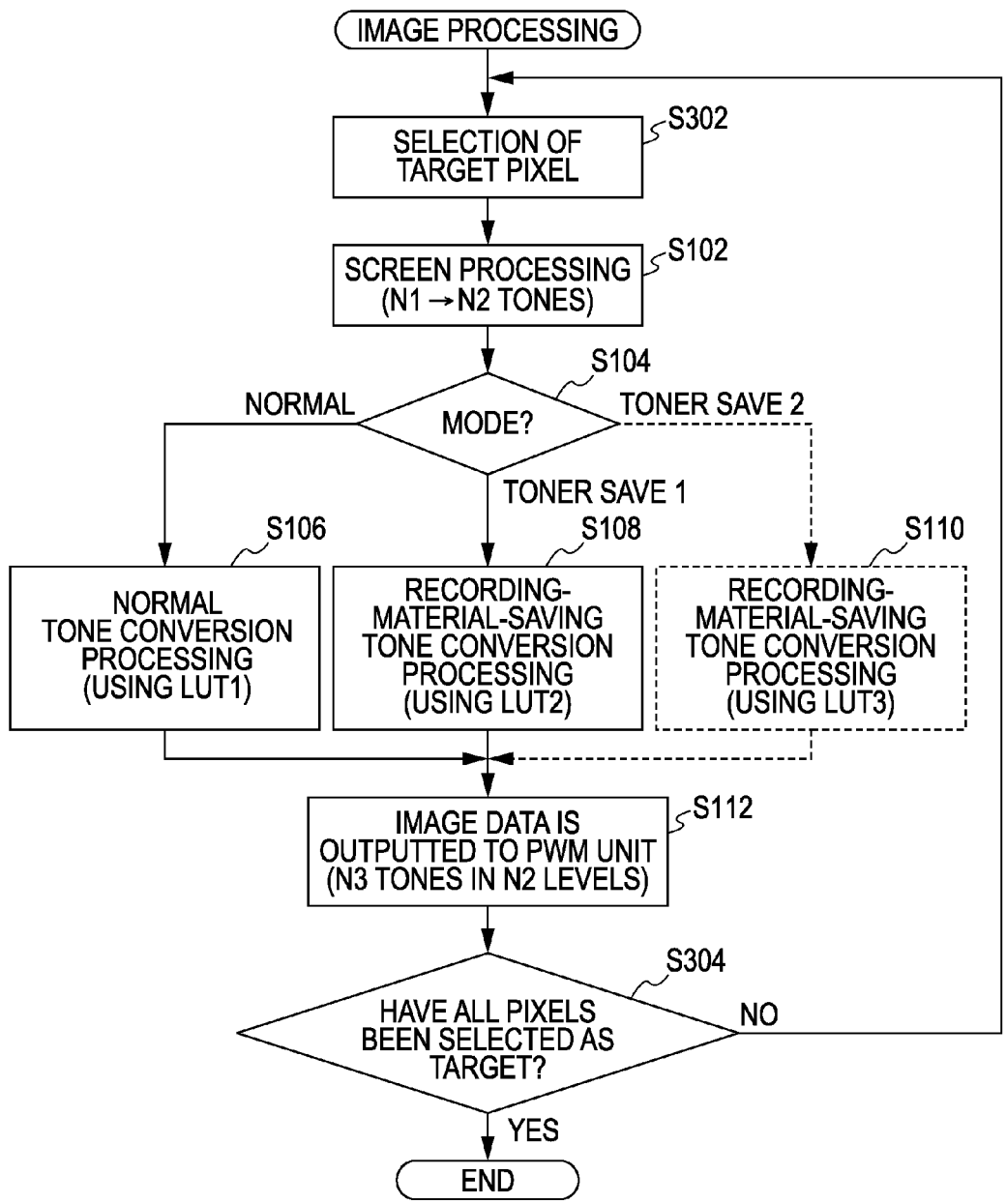
FIG. 10 is a flowchart that schematically illustrates an example of image processing controlled by an image processing controller according to a third embodiment of the invention.

FIG. 10 is a flowchart that schematically illustrates an example of image processing controlled by an image processing controller according to a third embodiment of the invention. An image processing controller according to the present embodiment of the invention (hereinafter referred to with the reference numeral 10) is configured to generate the output image data D4 by using a recording-material-saving correspondence lookup table that corresponds to the attribute of the input image data D1 for each of the plurality of pixels PI1 in the toner save mode. The attribute information DA1 shown in FIG. 2 contains information that indicates the type of an object for each of the plurality of pixels PI1 of the input image data D1. In FIG. 1, the attribute information DA1 is inputted from the RAM 23 into the image processing controller 10. The image processing controller 10 repeats the selection of a correspondence corresponding to the attribute information DA1 for a target pixel that is going to be subjected to tone conversion processing, that is, processing in which the recording-material-saving correspondence lookup table LUT2, LUT3 is looked up. The image processing illustrated in FIG. 10 includes processing in S302 and S304 as an addition to the image processing illustrated in FIG. 6.

The image processing controller 10 selectively determines a target pixel that is going to be subjected to screen processing and then to tone conversion processing in which the recording-material-saving correspondence is used (S302). For example, let's assume that the input image data D1 has Xd pixels in the X direction and Yd pixels in the Y direction. The coordinate of a pixel PI1 of an input image is expressed as (Xi, Yi), where the following relationships hold true: 0≦Xi≦Xd−1, and 0≦Yi≦Yd−1. The coordinate (Xi, Yi) of a target pixel is selectively determined within the above ranges while avoiding duplication. Thereafter, screen processing is performed on the input image data D1 having the N1 grayscale levels to generate the intermediate image data D2 having the N2 grayscale levels in S102. The process is branched depending on the print mode in S104. The intermediate image data D2 having the N2 grayscale levels is converted into the output image data D4 having the N3 grayscale levels according to the correspondence LUT1, LUT2, LUT3 in S106, S108, S110.

In S112, for the target pixel having the coordinate (Xi, Yi), the output switcher 14 selects the output image data D4 that corresponds to the print mode indicated by the mode information DM1 and outputs the selected output image data D4 to the PWM unit 30. For example, if the attribute information DA1 of the target pixel indicates either graphic or photograph, the output switcher 14 selects the output from the lookup table LUT2 containing the recording-material-saving correspondence for non-characters. Therefore, the output image data D4 obtained for the target pixel as a result of conversion according to the correspondence LUT2 is supplied to the PWM unit 30. If the attribute information DA1 of the target pixel indicates character, the output switcher 14 selects the output from the lookup table LUT3 containing the recording-material-saving correspondence for characters. Therefore, the output image data D4 obtained for the target pixel as a result of conversion according to the correspondence LUT3 is supplied to the PWM unit 30. In S304, it is judged whether all of the pixels PI1 of the input image have been selected as the target pixel or not. Processing in S302, S102 to S112, and S304 is repeated until the completion of target selection for all of the pixels PI1.

As a result of the above processing, the intermediate image data D2 having the N2 grayscale levels is converted into the output image data D4 having the N3 grayscale levels on the basis of the attribute of the input image for each of the plurality of pixels PI1. Therefore, it is possible to obtain the output image I1 in the recording material saving mode corresponding to the input attribute for each of the pixels P11. As with an image processing controller according to the present embodiment of the invention, an image processing controller according to the foregoing second embodiment of the invention may be configured to generate the output image data D4 by using a correspondence lookup table that corresponds to the attribute of the input image data D1 for each of the plurality of pixels P11. For example, S302 may be added to the image processing illustrated in FIG. 9 before S202. In addition, S304 may be added to the image processing illustrated therein after S214.

5. Fourth Embodiment

When color printing is performed, tone conversion processing according to the recording-material-saving correspondence LUT2, LUT3 may be performed for each of toner colors in the toner save mode. For example, if the printing apparatus 1 prints a color image by using a cyan (C) toner, a magenta (M) toner, a yellow (Y) toner, and a black (K) toner as described above, the image processing controller 10 performs screen processing on the input image data D1 having the N1 grayscale levels for each of these toner colors. Then, the image processing controller 10 converts the C intermediate image data D2 having the N2 grayscale levels into the C output image data D4 having the N3 grayscale levels, the M intermediate image data D2 having the N2 grayscale levels into the M output image data D4 having the N3 grayscale levels, the Y intermediate image data D2 having the N2 grayscale levels into the Y output image data D4 having the N3 grayscale levels, and the K intermediate image data D2 having the N2 grayscale levels into the K output image data D4 having the N3 grayscale levels according to the recording-material-saving correspondence. Since the available levels of the tone values of the output image data D4 supplied to the printing unit U4 are made greater for each of the colors in the recording material saving mode, it is possible to maintain picture quality as much as possible.

When color printing is performed, tone conversion processing according to the recording-material-saving correspondence LUT2, LUT3 may be performed for some of toner colors only in the toner save mode. If the printing apparatus 1 prints a color image by using a C toner, an M toner, a Y toner, and a K toner, color(s) that will be subjected to data conversion in the toner save mode may be set as, for example, C only, M only, Y only, K only, C and M only, or C, M, and Y.

Figure 11:
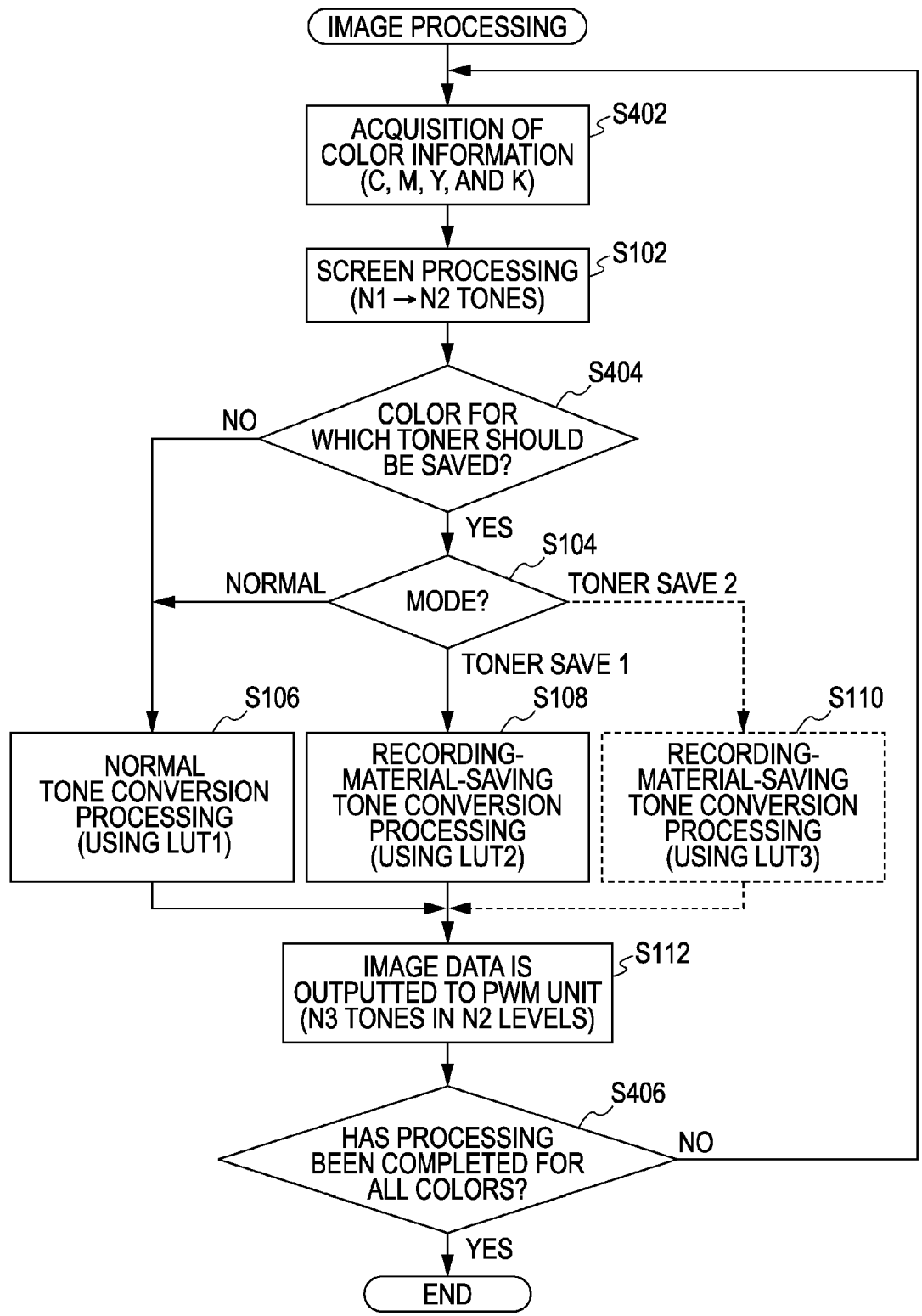
FIG. 11 is a flowchart that schematically illustrates an example of image processing controlled by an image processing controller according to a fourth embodiment of the invention.

FIG. 11 is a flowchart that schematically illustrates an example of image processing controlled by an image processing controller according to a fourth embodiment of the invention. The image processing controller 10 according to the present embodiment of the invention is configured to judge whether the toner save mode should be enabled or not for each of C, M, Y, and K. Color information DA2 is associated with the input image data D1 that is supplied for each of the colors. The color information DA2 indicates the toner color. In FIG. 1, the color information DA2 is inputted into the image processing controller 10 when the input image data D1 is supplied thereto. The image processing controller 10 performs screen processing on the input image data D1 having the N1 grayscale levels for each of these toner colors. Then, the image processing controller 10 converts the intermediate image data D2 having the N2 grayscale levels into the output image data D4 having the N3 grayscale levels for each of C, M, Y, and K. Color(s) for which toner should be saved has/have been determined in advance. If the color indicated by the color information DA2 is the predetermined color for saving toner, the toner save mode is enabled. If not, the toner save mode is disabled. The image processing illustrated in FIG. 11 includes processing in S402, S404, and S406 as an addition to the image processing illustrated in FIG. 6.

The image processing controller 10 according to the present embodiment of the invention acquires the color information DA2 that is associated with the input image data D1 (S402). In the present embodiment of the invention, the color indicated by the color information DA2 is any one of C, M, Y, and K. Then, screen processing is performed on the input image data D1 having the N1 grayscale levels to generate the intermediate image data D2 having the N2 grayscale levels in S102. In S404, it is judged whether the color information DA2 acquired in S402 is information that indicates a color for which toner should be saved or not. If the judgment condition is not met (NO), the intermediate image data D2 having the N2 grayscale levels is converted into the output image data D4 having the N3 grayscale levels according to the normal correspondence LUT1 in S106. If the judgment condition is met (YES), the process is branched depending on the print mode in S104. The intermediate image data D2 having the N2 grayscale levels is converted into the output image data D4 having the N3 grayscale levels according to the correspondence LUT1, LUT2, LUT3 in S106, S108, S110.

In S112, the output switcher 14 is switched according to tone conversion processing in S106, S108, S110. The output image data D4 is outputted to the PWM unit 30. In S406, it is judged whether the output image data D4 having the N3 grayscale levels has been outputted to the PWM unit 30 for each of the toner colors or not. Processing in S402, S102, S404, S104 to S112, and S406 is repeated until the completion of data output for all of the toner colors. If the image processing controller 10 illustrated in FIG. 1 or FIG. 8 is provided as an individual image processing controller for each of toner colors, for example, four controllers for C, M, Y, and K as in this example, the judgment in S406 is not necessary.

As explained above, since the intermediate image data D2 having the N2 grayscale levels is converted into the output image data D4 having the N3 grayscale levels through tone conversion processing corresponding to the color of toner, it is possible to enhance the quality of the output image I1 in the recording material saving mode.

The combination of the colors of toner is not limited to C, M, Y, and K. The number of the colors of toner may be, for example, five. Irrespective of specific colors in combination, the output image data D4 can be generated through tone conversion processing corresponding to the color of toner. The concept of the present embodiment of the invention may be applied to the foregoing second and third embodiments of the invention to generate the output image data D4 through tone conversion processing corresponding to the color of toner. For example, S402 and S404 may be added to the image processing illustrated in FIG. 9 before S202. In addition, S406 may be added to the image processing illustrated therein after S214.

When monochrome printing is performed, tone conversion processing according to the recording-material-saving correspondence LUT2, LUT3 may be performed for K only in the toner save mode. Since the available levels of the tone values of the output image data D4 supplied to the printing unit U4 are made greater for K in the recording material saving mode, it is possible to maintain picture quality as much as possible.

6. Variation Examples

In each of the foregoing embodiments of the invention, the N1 grayscale levels of the input image data D1, the N2 grayscale levels of the intermediate image data D2, and the N3 grayscale levels of the output image data D4 may be modified as long as the foregoing set of formulae holds true: $3 \leq N2 < N1$, and $N3 > N2$. For example, the value N3 of the grayscale levels of the output image data D4 may be 128 or 256, the latter of which is the same as N1. As N3 increases, N2 can also be increased, for example, to 64. Though the term "lookup table" is used in the foregoing embodiments of the invention, the recording-material-saving correspondence(s) and the normal correspondence are not limited to tables for conversion. For example, they may be calculating formulae. The normal mode may include a plurality of print modes. In such a modified configuration, tone conversion processing may be performed on the basis of the corresponding one of normal correspondences different from one normal mode to another.

Printing apparatuses to which the present invention can be applied include various apparatuses that can form an image in a mode for saving a recording material. Examples of the apparatuses are: a page printer that is equipped with an LED (Light Emitting Diode) print head, an ink-jet printer, and a multi-function printer having a scanning function and a facsimile function.

Figure 12A:
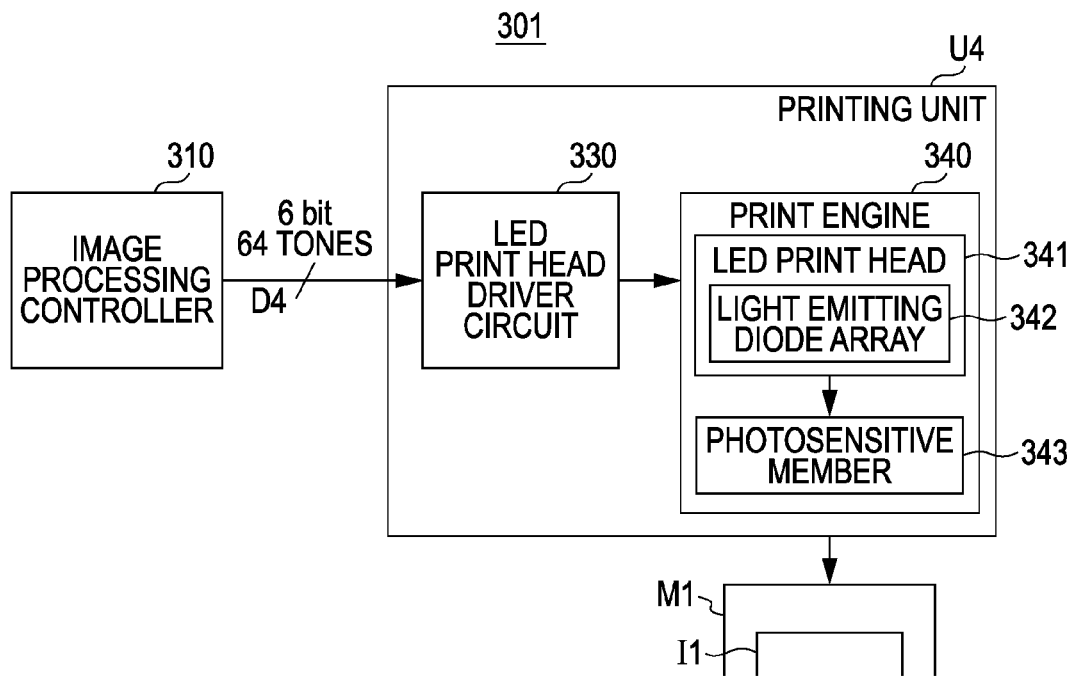
FIG. 12A is a block diagram that schematically illustrates the configuration of essential components of a page printer according to a variation example of the invention.

FIG. 12A is a diagram that schematically illustrates the configuration of essential components of a page printer 301 according to a variation example of the invention. The page printer 301 is an example of a printing apparatus. An LED print head 341 is mounted on the page printer 301. The page printer 301 includes an image processing controller 310, an LED print head driver circuit 330, and a print engine 340. The image processing controller 310 is a controller for a page printer. The output image data D4 having the N3 grayscale levels is inputted into the LED print head driver circuit 330. The LED print head driver circuit 330 converts the output image data D4 into a driving signal that is suited for dot formation by means of light emitted from a light emitting diode array 342. The LED print head driver circuit 330 outputs the driving signal to the print engine 340. The driving signal outputted from the LED print head driver circuit 330 is inputted into to the LED print head 341 of the print engine 340. The light emitting diode array 342 emits light onto a photosensitive member 343 in a pattern that is in accordance with the output image data D4, thereby forming the output image I1 on the print target medium M1. The output image I1 exhibits no gradation loss not only in the normal mode but also in the toner save mode. Thus, the N3 grayscale information of the output image data D4 can be expressed in both of these modes. Therefore, since the available levels of the tone values of the output image data D4 supplied to the printing unit U4 are made greater in a recording material saving mode, it is possible to maintain picture quality as much as possible.

Figure 12B:
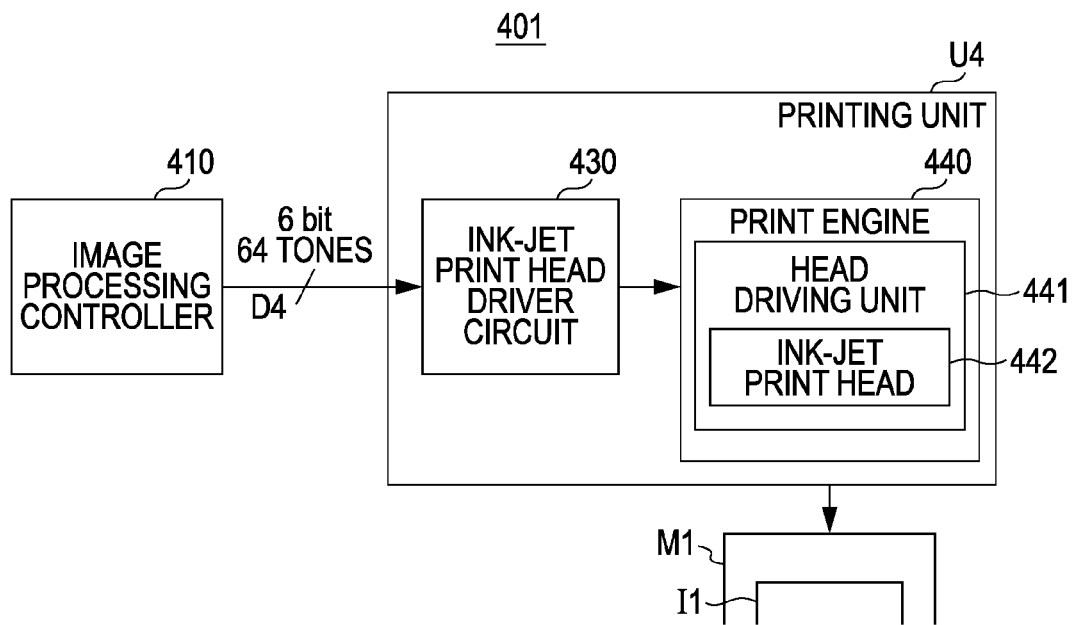
FIG. 12B is a block diagram that schematically illustrates the configuration of essential components of an ink jet printer according to a variation example of the invention.
Figure 13:
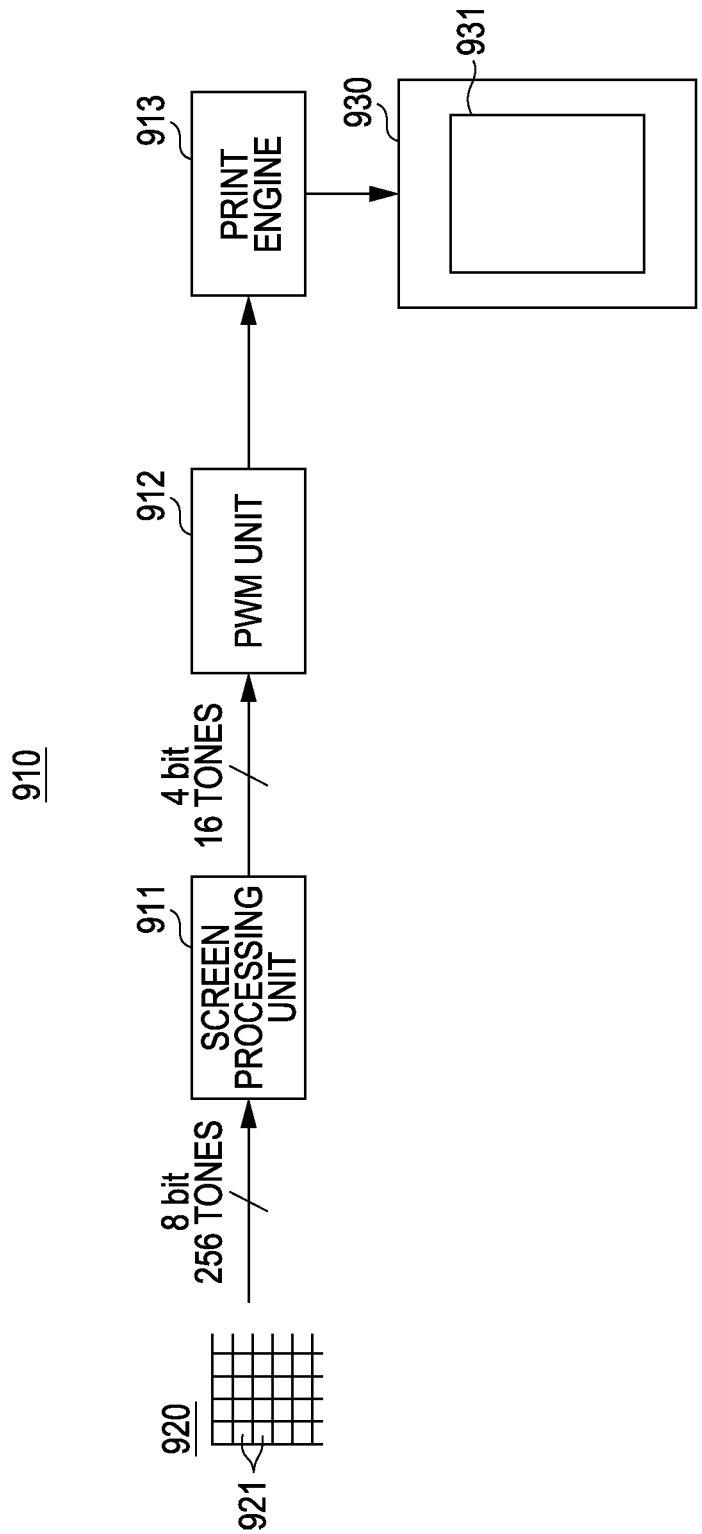
FIG. 13 is a block diagram that schematically illustrates an example of the configuration of a laser printer according to related art.

FIG. 12B is a diagram that schematically illustrates the configuration of essential components of an ink-jet printer 401 according to a variation example of the invention. The ink-jet printer 401 is an example of a printing apparatus. A head driving unit 441 including an ink jet print head 442 is mounted on the ink-jet printer 401. The ink-jet printer 401 includes an image processing controller 410, an ink jet print head driver circuit 430, and a print engine 440. The image processing controller 410 is a controller for an ink jet printer. The output image data D4 having the N3 grayscale levels is inputted into the ink jet print head driver circuit 430. The ink-jet print head driver circuit 430 converts the output image data D4 into a driving signal that is suited for dot formation by means of ink droplets (recording material) discharged from the ink-jet print head 442. The ink-jet print head driver circuit 430 outputs the driving signal to the print engine 440. The driving signal outputted from the ink jet print head driver circuit 430 is inputted into to the head driving unit 441 of the print engine 440. The ink-jet print head 442 discharges ink droplets onto the print target medium M1 in a pattern that is in accordance with the output image data D4, thereby forming the output image I1 on the print target medium M1. The output image I1 exhibits no gradation loss not only in the normal mode but also in an "ink save" mode (recording material saving mode). Thus, the N3 grayscale information of the output image data D4 can be expressed in both of these modes. Therefore, since the available levels of the tone values of the output image data D4 supplied to the printing unit U4 are made greater in a recording material saving mode, it is possible to maintain picture quality as much as possible.

A controller, an apparatus, a system, a method, and a program that include constituent elements and features of an independent claim only and thus does not include constituent elements and features of any dependent claim can also offer basic advantages and produce basic effects that are the same as those described in the foregoing embodiments of the invention. As explained above, the invention can provide, in various modes, an image processing controller, a printing apparatus, an image formation system, an image processing method, a printing method, an image formation method, an image processing program, a printing program, and an image formation program that can maintain picture quality as much as possible in a recording material saving mode, which is a mode for forming an output image while saving a recording material. In addition, the invention can provide a computer readable storage medium in which any of these programs is stored.

It should be noted that the scope of the invention is not limited to any of exemplary embodiments and variation examples described above. For example, a modified configuration in which any of components disclosed in the foregoing embodiments and the variation examples are replaced with each other or one another or a combination thereof is changed is also encompassed in the scope of the invention. Or, as another example, a modified configuration in which any of components disclosed in the related art, the foregoing embodiments, and the variation examples are replaced with each other or one another or a combination thereof is changed is also encompassed in the scope of the invention.

The entire disclosure of Japanese Patent Application No. 2009-256866, filed Nov. 10, 2009 and No. 2010-106430, filed May 6, 2010 are expressly incorporated by reference herein.

What is claimed is:

1. An image processing controller for performing screen processing for tone reduction of input image data, which has a tone value in N1 tones (where N1 is an integer that is greater than or equal to four) for each pixel, from the N1 tones into N2 tones (where N2 is an integer that is greater than or equal to three but less than N1) and generating output image data that is to be supplied to a printing unit, the printing unit being configured to be able to form an output image with the use of a recording material in accordance with the output image data, the output image data having N3 tones greater than the N2 tones of intermediate image data (N3 is an integer that is greater than N2), the intermediate image data being generated as a result of the screen processing performed on the input image data, the image processing controller comprising:

a correspondence prescribing section that has a recording-material-saving correspondence that is used in a recording material saving mode for forming the output image while saving the recording material, the recording-material-saving correspondence prescribing correspondence between tone values of the intermediate image data having the N2 tones and tone values of the output image data having the N3 tones; and a recording-material-saving image processing section that performs the screen processing on the input image data having the N1 tones to generate the intermediate image data having the N2 tones, converts the intermediate image data having the N2 tones into the output image data having the N3 tones according to the recording-material-saving correspondence, and then supplies the output image data to the printing unit.

2. The image processing controller according to claim 1, wherein the recording-material-saving correspondence is a conversion table that contains tone values in levels of N2 selected out of tone values of the output image data having the N3 tones; and, in the conversion table, each of the N2 selected tone values for the output image data having the N3 tones is associated with the corresponding one of the tone values of the intermediate image data having the N2 tones.

3. The image processing controller according to claim 1, further comprising a normal image processing section, wherein the correspondence prescribing section further has a normal correspondence that is used in a normal mode for forming the output image by using normal amount of the recording material, the normal correspondence prescribing correspondence between the tone values of the intermediate image data having the N2 tones and tone values of the output image data having the N3 tones; and, in the normal mode, the normal image processing section performs the screen processing on the input image data having the N1 tones to generate the intermediate image data having the N2 tones, converts the intermediate image data having the N2 tones into the output image data having the N3 tones according to the normal correspondence, and then supplies the output image data to the printing unit.

4. The image processing controller according to claim 1, further comprising a normal image processing section that performs, in a normal mode for forming the output image by using normal amount of the recording material, the screen processing for the normal mode on the input image data having the N1 tones to directly convert the input image data into the output image data having the N3 tones and then supplies the output image data to the printing unit.

5. The image processing controller according to claim 1, wherein the recording-material-saving correspondence includes a plurality of recording-material-saving correspondences that are different from each other or one another; the plurality of recording-material-saving correspondences are respectively associated with possible attributes of the input image data that are different from each other or one another; and the recording-material-saving image processing section converts the intermediate image data having the N2 tones into the output image data having the N3 tones according to the recording-material-saving correspondence associated with the attribute of the input image data selectively between or out of the plurality of recording-material-saving correspondences.

6. The image processing controller according to claim 5, wherein the plurality of recording-material-saving correspondences includes a recording-material-saving correspondence for character that is used when the attribute of the input image data is character and a recording-material-saving correspondence for non-character that is used when the attribute of the input image data is either graphic or photograph, or both; the recording-material-saving correspondence for non-character prescribes smaller amount of the recording material to be used than that prescribed by the recording-material-saving correspondence for character; the recording-material-saving image processing section converts the intermediate image data having the N2 tones into the output image data having the N3 tones according to the recording-material-saving correspondence for character when the attribute of the input image data is character; and the recording-material-saving image processing section converts the intermediate image data having the N2 tones into the output image data having the N3 tones according to the recording-material-saving correspondence for non-character when the attribute of the input image data is either graphic or photograph, or both.

7. A printing apparatus for performing screen processing for tone reduction of input image data, which has a tone value in N1 tones (where N1 is an integer that is greater than or equal to four) for each pixel, from the N1 tones into N2 tones (where N2 is an integer that is greater than or equal to three but less than N1) and performing printing, comprising:
   a printing section that forms an output image with the use of a recording material in accordance with output image data, the output image data having N3 tones greater than the N2 tones of intermediate image data (N3 is an integer that is greater than N2), the intermediate image data being generated as a result of the screen processing performed on the input image data;
   a correspondence prescribing section that has a recording-material-saving correspondence that is used in a recording material saving mode for forming the output image while saving the recording material, the recording-material-saving correspondence prescribing correspondence between tone values of the intermediate image data having the N2 tones and tone values of the output image data having the N3 tones; and
   a recording-material-saving image processing section that performs the screen processing on the input image data having the N1 tones to generate the intermediate image data having the N2 tones, converts the intermediate image data having the N2 tones into the output image data having the N3 tones according to the recording-material-saving correspondence, and then supplies the output image data to the printing section.

8. The printing apparatus according to claim 7, wherein the printing section includes a print engine that irradiates a photosensitive member with a laser beam in a pattern that is in accordance with the output image data to form the output image, a print engine that uses a light emitting diode array to emit light onto a photosensitive member in a pattern that is in accordance with the output image data to form the output image, or a print engine that discharges ink onto a print target medium in a pattern that is in accordance with the output image data to form the output image.

* * * * *